(12) United States Patent
Naik et al.

(10) Patent No.: US 11,444,855 B2
(45) Date of Patent: Sep. 13, 2022

(54) SYSTEM AND METHOD FOR DETERMINING A DATA FLOW PATH IN AN OVERLAY NETWORK

(71) Applicant: Juniper Networks, Inc., Sunnyvale, CA (US)

(72) Inventors: Manoj Ganesh Naik, Santa Clara, CA (US); Harshit Naresh Chitalia, Mountain View, CA (US); Biswajit Mandal, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/922,963

(22) Filed: Jul. 7, 2020

(65) Prior Publication Data
US 2022/0014451 A1 Jan. 13, 2022

(51) Int. Cl.
*G06F 3/048* (2013.01)
*H04L 43/045* (2022.01)
(Continued)

(52) U.S. Cl.
CPC .......... *H04L 43/045* (2013.01); *H04L 43/062* (2013.01); *H04L 45/02* (2013.01); *G06F 3/0482* (2013.01)

(58) Field of Classification Search
CPC ..... H04L 43/045; H04L 43/062; H04L 45/02; H04L 41/22; H04L 41/12; H04L 43/026; H04L 43/08; H04L 45/64; G06F 3/0482
See application file for complete search history.

(56) References Cited

U.S. PATENT DOCUMENTS 8,010,469 B2 8/2011 Kapoor et al.
9,838,316 B2 12/2017 Hegde et al.
(Continued)

FOREIGN PATENT DOCUMENTS

CN 105262615 A 1/2016
CN 105939260 A 9/2016
(Continued)

OTHER PUBLICATIONS

Extended Search Report from counterpart European Application No. 20198776.5, dated Feb. 22, 2021, 9 pp.
(Continued)

*Primary Examiner* — Aleksey Olshannikov
(74) *Attorney, Agent, or Firm* — Shumaker & Sieffert, P.A.

(57) ABSTRACT

This disclosure describes techniques that include receiving underlay flow data from a network having an underlay network and one or more overlay network, storing information identifying, for each underlay data flow, an overlay network, displaying, within a display, a topological map of at least a portion of the underlay network, highlighting a data path through the displayed topological map, the highlighted data path extending through the underlay network from the underlay network source of the respective underlay data flow to the underlay network destination of the respective underlay data flow; receiving a request for metrics associated with the highlighted data path, wherein receiving a request includes receiving, via a graphical user interface, an indication selecting at least a portion of the highlighted data path; and displaying, proximate to the highlighted data path, metrics associated with data traffic through the selected portion of the highlighted data path.

17 Claims, 13 Drawing Sheets

(51) Int. Cl.
*H04L 43/062* (2022.01)
*H04L 45/02* (2022.01)
*G06F 3/0482* (2013.01)

(56) References Cited

U.S. PATENT DOCUMENTS

| | | |
|---|---|---|
| D810,121 S | 2/2018 | McClellan |
| D820,297 S | 6/2018 | Gardner et al. |
| D872,121 S | 1/2020 | Einspahr et al. |
| 10,547,521 B1 | 1/2020 | Roy et al. |
| D884,726 S | 5/2020 | Regev et al. |
| 10,673,714 B1 | 6/2020 | Chitalia et al. |
| D902,229 S | 11/2020 | Chitalia et al. |
| 10,855,604 B2 | 12/2020 | Tigli |
| 10,924,419 B1 | 2/2021 | Chitalia et al. |
| D916,831 S | 4/2021 | Daie et al. |
| 2009/0168648 A1 | 7/2009 | Labovitz et al. |
| 2009/0276771 A1 | 11/2009 | Nickolov et al. |
| 2012/0026914 A1 | 2/2012 | Banerjee et al. |
| 2013/0212507 A1 | 8/2013 | Fedoseyeva et al. |
| 2013/0332601 A1 | 12/2013 | Nakil et al. |
| 2015/0052441 A1 | 2/2015 | Degionanni |
| 2015/0244617 A1 | 8/2015 | Nakil et al. |
| 2015/0256413 A1* | 9/2015 | Du .................. H04L 41/12 370/216 |
| 2015/0331597 A1 | 11/2015 | Ng |
| 2017/0288945 A1 | 10/2017 | Chandangoudar |
| 2018/0191767 A1 | 7/2018 | Habib et al. |
| 2018/0287902 A1 | 10/2018 | Chitalia et al. |
| 2018/0329794 A1* | 11/2018 | Prieto ............... G06F 11/3006 |
| 2019/0058649 A1 | 2/2019 | Qi et al. |
| 2019/0312813 A1 | 10/2019 | Ellis et al. |
| 2020/0021514 A1 | 1/2020 | Michael et al. |
| 2020/0112510 A1 | 4/2020 | Kapoor et al. |
| 2020/0344143 A1 | 10/2020 | K et al. |
| 2020/0366578 A1 | 11/2020 | Punj et al. |
| 2021/0328891 A1* | 10/2021 | Cherkas ............. H04L 43/0852 |

FOREIGN PATENT DOCUMENTS

| | | |
|---|---|---|
| CN | 107077372 A | 8/2017 |
| CN | 107094090 A | 8/2017 |
| EP | 3382546 A1 | 10/2018 |
| EP | 3382959 A2 | 10/2018 |
| WO | 2016069382 A1 | 5/2016 |

OTHER PUBLICATIONS

U.S. Appl. No. 16/917,690, filed Jun. 30, 2020 entitled "Application Flow Monitoring", Juniper Networks, Inc.

U.S. Appl. No. 16/541,947, filed Aug. 15, 2019 entitled "Underlay-Overlay Correlation", Juniper Networks, Inc.

U.S. Appl. No. 16/922,915, filed Jul. 7, 2020 entitled "System and Method for Determining a Data Flow Path in an Overlay Network", Juniper Networks, Inc.

Notice of Allowance from U.S. Appl. No. 16/541,947, dated Oct. 20, 2020, 20 pp.

U.S. Appl. No. 29/652,529, filed Sep. 11, 2020, naming inventors Naik et al.

U.S. Appl. No. 17/248,940, filed Feb. 12, 2021, naming inventors Chitalia et al.

Hofstede et al., "Flow Monitoring Explained: From Packet Capture to Data Analysis With NetFlow and IPFIX," IEEE Communications Surveys & Tutorials 16(4), Apr. 2014, pp. 2037-2064.

Office Action from U.S. Appl. No. 29/652,529, dated Nov. 15, 2021, 6 pp.

Response to Office Action dated Nov. 15, 2021, from U.S. Appl. No. 29/652,529, filed Feb. 4, 2022, 7 pp.

Ex Parte Quayle Office Action from U.S. Appl. No. 29/652,529, dated May 11, 2022, 8 pp.

Response to Ex Parte Office Action dated May 11, 2022, from U.S. Appl. No. 29/652,529 filed Jul. 11, 2022, 7 pp.

Response to Extended Search Report dated Jan. 12, 2022, from counterpart European Application No. 20198776.5 filed Jul. 12, 2022, 17 pp.

* cited by examiner

301

| FLOW TYPE | TIME STAMP | NETWORK DEVICE | BYTES | SRC IP | DST IP | SRC PORT | DEST PORT | PROTO | SRC VN | DST VN |
|---|---|---|---|---|---|---|---|---|---|---|
| 1 | sFlow | 5 | a7 | 10 | 1.1.1.1 | 2.2.2.2 | 81 | 82 | TCP | | |
| 2 | overlay | 6 | | 20 | 1.1.1.1 | 2.2.2.2 | 81 | 82 | TCP | a | b |
| 3 | sFlow | 7 | a7 | 30 | 1.1.1.1 | 2.2.2.2 | 81 | 82 | TCP | | |
| 4 | overlay | 8 | | 40 | 1.1.1.1 | 2.2.2.2 | 81 | 83 | TCP | c | d |
| 5 | sFlow | 9 | a8 | 50 | 1.1.1.1 | 2.2.2.2 | 81 | 83 | TCP | | |
| 6 | overlay | 9 | | 60 | 1.1.1.1 | 2.2.2.2 | 81 | 82 | TCP | e | f |
| 7 | overlay | 10 | | 70 | 1.1.1.1 | 2.2.2.2 | 81 | 83 | TCP | g | h |

302 — "SELECT networkDevice, bytes, srvVn WHERE timestamp in <7;9>"

303

| | NETWORK DEVICE | BYTES | SRC VN |
|---|---|---|---|
| 1 | a7 | 30 | e |
| 2 | a8 | 50 | c |

FIG. 3

SYSTEM AND METHOD FOR DETERMINING A DATA FLOW PATH IN AN OVERLAY NETWORK

TECHNICAL FIELD

This disclosure relates to analysis of computer networks, including the analysis of paths taken by data through a network.

BACKGROUND

Virtualized data centers are becoming a core foundation of the modern information technology (IT) infrastructure. Modern data centers rely on virtualized environments in which virtual hosts deployed within the virtualized environment as, for example, virtual machines or containers, execute on an underlying compute platform of physical computing devices.

Current network infrastructure is often a combination of physical and virtual networks. The combination of physical and virtual networks can make it difficult to track down network issues. Viewing the path a packet takes in a network comes in handy to a network administrator when identifying network issues. There are command line tools which can reveal the routes but such tools are difficult to comprehend.

SUMMARY

This disclosure describes techniques that include collecting information about data traffic on physical network infrastructure (e.g., underlay flow data) and information about data traffic on virtual networks (e.g., overlay flow data), and correlating the data to enable insights into network operation and performance. In some examples, samples of both underlay flow data and overlay flow data are collected and stored in a way that enables not only high availability and high-volume flow data collection, but also enables analysis of such data in response to analytical queries. Underlay flow data may be enriched, augmented, and/or supplemented with overlay flow data to enable visibility into, identification of, and/or analysis of the underlay network infrastructure that may correspond to overlay data flows. For example, a network analysis system may collect samples of underlay flow data, identify an underlay data flow associated with each sample, and identify an overlay network associated with each respective underlay data flow. The results may be used to identify underlay network infrastructure supporting the overlay data flow. In one such example approach, the results may also be used to illustrate, via diagrams and other information displayed on a user interface, components of the underlay network infrastructure that correspond to various overlay or underlay data flows.

The techniques described herein may provide one or more technical advantages. For instance, IT personnel may use information showing how the underlay network infrastructure relates to various overlay data flows to perform efficient and streamlined troubleshooting and analysis of a virtualized network. As an example, the techniques described herein may allow for more efficient troubleshooting of connectivity by reducing the population of underlay network devices likely to be pertinent to the connectivity issue. As another example, the techniques described herein may allow for more efficient troubleshooting via data path visualization.

In some examples, this disclosure describes operations performed by a network analysis system or other network system in accordance with one or more aspects of this disclosure. In one specific example, this disclosure describes a method including receiving underlay flow data from a network having an underlay network and one or more overlay networks, the underlay network including a plurality of network devices, the underlay flow data including information identifying an underlay network source, an underlay network destination, an overlay network source and an overlay network destination for each underlay data flow; storing, in a data store, information identifying, for each underlay data flow, an overlay network and the underlay network source, the underlay network destination, the overlay network source, and the overlay network destination of the respective underlay data flow; displaying, within a display, a topological map of at least a portion of the underlay network; highlighting a data path through the displayed topological map, the highlighted data path extending through the underlay network from the underlay network source of the respective underlay data flow to the underlay network destination of the respective underlay data flow; receiving a request for metrics associated with the highlighted data path, wherein receiving a request includes receiving, via a graphical user interface, an indication selecting at least a portion of the highlighted data path; and displaying, proximate to the highlighted data path, metrics associated with data traffic through the selected portion of the highlighted data path.

In another specific example, this disclosure describes a system having a network, the network having a plurality of network devices configured in an underlay network and one or more overlay networks executing on the network devices; and processing circuitry connected to the network, the processing circuitry configured to perform operations comprising receiving underlay flow data from the network, the underlay flow data including information identifying an underlay network source, an underlay network destination, an overlay network source and an overlay network destination for each underlay data flow; displaying, within a display, a topological map of at least a portion of the underlay network; highlighting a data path through the displayed topological map, the data path extending through the underlay network from an underlay network source address to an underlay network destination address; receiving a request for metrics associated with the highlighted data path, wherein receiving a request includes receiving, via a graphical user interface, information selecting at least a portion of the highlighted data path; and displaying, proximate to the highlighted data path, metrics associated with data traffic through the selected portion of the highlighted data path.

In yet another example, this disclosure describes a non-transitory computer-readable storage medium comprising instructions that, when executed, configure processing circuitry of a computing system to perform operations comprising receiving underlay flow data from a network having an underlay network and one or more overlay networks, the underlay network including a plurality of network devices, the underlay flow data including information identifying an underlay network source, an underlay network destination, an overlay network source and an overlay network destination for each underlay data flow; storing, in a data store, information identifying, for each underlay data flow, an overlay network and the underlay network source, the underlay network destination, the overlay network source, and the overlay network destination of the respective underlay data flow; displaying, within a display, a topological map of at least a portion of the underlay network; highlighting a data path through the displayed topological map, the highlighted data path extending through the underlay network from the underlay network source of the respective underlay data flow to the underlay network destination of the respective underlay data flow; receiving a request for metrics associated with the highlighted data path, wherein receiving a request includes receiving, via a graphical user interface, an indication selecting at least a portion of the highlighted data path; and displaying, proximate to the highlighted data path, metrics associated with data traffic through the selected portion of the highlighted data path.

BRIEF DESCRIPTION OF THE DRAWINGS

FIG. 3 is a conceptual diagram illustrating an example query executing on stored underlay and overlay flow data, in accordance with one or more aspects of the present disclosure.

DETAILED DESCRIPTION

Data centers use virtualized environments in which virtual hosts, such as virtual machines or containers, are deployed and then execute on an underlying compute platform of physical computing devices. As noted above, such an approach provides efficiency, cost savings, and organizational advantages when deploying a data center. Such an approach may, however, cause challenges when analyzing, evaluating, and/or troubleshooting network operations in the data center. IT staff trying to manage a data center still require meaningful insights into application workloads. Underlay flow data collected from networking devices may be used to provide such insight.

Current network infrastructure is often a combination of physical and virtual networks. The combination of physical and virtual networks can make it difficult to track down network issues. Viewing the path a packet takes in a network comes in handy to a network administrator for identifying network issues. There are command line tools which can reveal the routes that packets take but such tools are difficult to comprehend. Visualizing it on a topology graph along with the traffic empowers the administrator to narrow down on the issue.

In general, flows are a "set of packets which share a common property." A very common flow is based on a 5 tuple: source IP address, destination IP address, source port, destination port and the IP protocol. When a virtual machine sends or receives IP traffic, forward and reverse flow entries are setup. An overlay flow entry is created, and the packet is sent to a vRouter Agent (such as Contrail vRouter Agent). The agent may also create an overlay flow entry for the reverse direction, where relevant. The vRouter agent then sends the flow to a collector to store in an analytics database for further analysis. In one example approach, this overlay flow entry contains all the information about source and destination virtual machine IP addresses and virtual networks. In one example approach, each virtual network creates a logical partition among a tenant using the networks.

In various examples described herein, a network analysis system collects underlay and overlay traffic samples associated with the flows and processes the traffic samples, via analytics algorithms, to correlate information about overlay traffic with information about the underlay infrastructure. In some examples, a user interface is used to show how the underlay infrastructure correlates with various overlay networks. The user interface may, therefore, provide insights into the network, and may provide users, administrators, and/or other personnel with tools for network discovery, investigation, and troubleshooting.

Figure 1A:
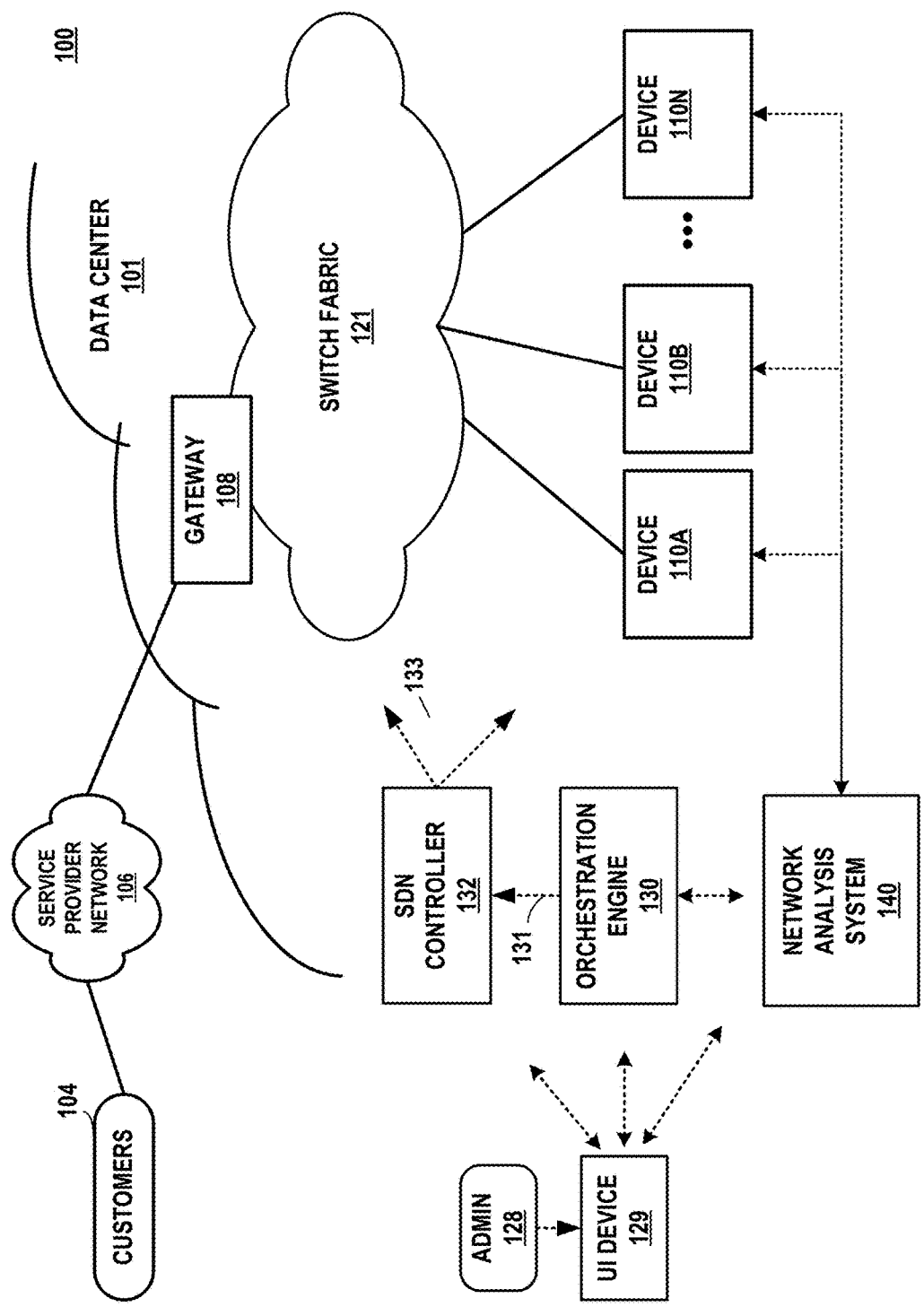
FIGS. 1A and 1B are conceptual diagrams illustrating an example system that includes a data center and a network analysis system used to analyze traffic flows across and/or within the data center, in accordance with one or more aspects of the present disclosure.

FIG. 1A is a conceptual diagram illustrating an example system that includes a data center and a network analysis system used to analyze traffic flows across and/or within the data center, in accordance with one or more aspects of the present disclosure. FIG. 1A illustrates one example implementation of a network system 100 having a data center 101 that hosts one or more computing networks, computing domains, and/or cloud-based computing networks, generally referred to herein as a cloud-based computing cluster. Cloud-based computing clusters may be co-located in a common overall computing environment, such as a single data center 101, or may be distributed across environments, such as across different data centers 101. Cloud-based computing clusters may, for example, be combinations of different cloud environments, such as various combinations of OpenStack cloud environments, Kubernetes cloud environments or other computing clusters, domains, networks and the like. Other implementations of network system 100 and data center 101 may include a subset of the components included in the example of FIG. 1A and/or may include additional components not shown in FIG. 1A.

In the example of FIG. 1A, data center 101 provides an operating environment for applications and services for customers 104 coupled to data center 101 by a service provider network 106. Although functions and operations described in connection with network system 100 of FIG. 1A may be illustrated as being distributed across multiple devices in FIG. 1A, in other examples, the features and techniques attributed to one or more devices in FIG. 1A may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1A or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 101 may represent one of many geographically distributed network data centers. As illustrated in the example of FIG. 1A, data center 101 is a facility that provides network services for customers 104. Customers 104 may be collective entities such as enterprises and governments or may be individuals. For example, a network data center may host web services for several enterprises and for end users. Other exemplary services may include data storage, virtual private networks, traffic engineering, file service, data mining, scientific- or super-computing, and so on. In some examples, data center 101 is an individual network server, a network peer, or otherwise.

In the example of FIG. 1A, data center 101 includes a set of storage systems, application servers, compute nodes, or other devices, including network device 110A through network device 110N (collectively "network devices 110"). In some examples, such as shown in FIG. 1A, network devices 110 are interconnected via a high-speed switch fabric 121 provided by one or more tiers of physical network switches and routers. In some examples, network devices 110 may be included within fabric 121, but are shown here separately for ease of illustration. Network devices 110 may be any of a number of different types of network devices (core switches, spine network devices, leaf network devices, edge network devices, or other network devices), but in some examples, one or more devices 110 may serve as physical compute nodes of the data center. For example, one or more of devices 110 may provide an operating environment for execution of one or more customer-specific virtual machines or other virtualized instances, such as containers. In such an example, one or more of devices 110 may be alternatively referred to as a host computing device or, more simply, as a host. A network device 110 may thereby execute one or more virtualized instances, such as virtual machines, containers, or other virtual execution environment for running one or more services, such as virtualized network functions (VNFs).

In general, each of network devices 110 may be any type of device that may operate on a network and which may generate data (e.g. flow data or sFlow data) accessible through telemetry or otherwise, which may include any type of computing device, sensor, camera, node, surveillance device, or other device. Further, some or all of network devices 110 may represent a component of another device, where such a component may generate data collectible through telemetry or otherwise. For example, some or all of network devices 110 may represent physical or virtual network devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 101 and customers 104 via service provider network 106. In one example approach, a gateway 108 acts to forward and receive packets between switch fabric 121 and service provider network 106.

In the example shown in FIG. 1A, data center 101 includes a network analysis system 140, a Software-Defined Networking ("SDN") controller 132, and an orchestration engine 130. SDN controller 132 provides a logically (and in some cases physically) centralized controller for facilitating operation of one or more virtual networks within data center 101, in accordance with one or more examples of this disclosure. In some examples, SDN controller 132 operates in response to configuration input received from orchestration engine 130 via a northbound Application Programming Interface (API) 131, which in turn may operate in response to configuration input received from an administrator 128 interacting with and/or operating user interface device 129.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than network analysis system 140, SDN controller 132, and orchestration engine 130. In such examples, user interface device 129 may communicate with network analysis system 140, SDN controller 132 and orchestration engine 130 via a network or other means of communication. In other examples, user interface device 129 may be a local peripheral of network analysis system 140, SDN controller 132 or orchestration engine 130, or may be integrated into network analysis system 140, SDN controller 132 or orchestration engine 130.

In some examples, orchestration engine 130 manages functions of data center 101 such as compute, storage, networking, and application resources. For example, orchestration engine 130 may create a virtual network for a tenant within data center 101 or across two or more data centers 101. Orchestration engine 130 may also attach virtual machines (VMs) to a tenant's virtual network. Orchestration engine 130 may also connect a tenant's virtual network to an external network, e.g. the Internet or a VPN. Orchestration engine 130 may also implement a security policy across a group of VMs or to the boundary of a tenant's network and/or may deploy a network service (e.g. a load balancer) in a tenant's virtual network.

In some examples, SDN controller 132 manages networks within data center 101 and manages networking services such load balancing, security, and may allocate resources from devices 110 that serve as host devices to various applications via southbound API 133. In one example approach, southbound API 133 represents a set of communication protocols utilized by SDN controller 132 to make the actual state of networks within data center 101 equal to the desired state as specified by orchestration engine 130. For example, SDN controller 132 may implement high-level requests from orchestration engine 130 by configuring physical switches, e.g. top-of-rack (TOR) switches, chassis switches, and switch fabric 121; physical routers; physical service nodes such as firewalls and load balancers; and virtual services such as virtual firewalls in a VM. In one such example approach, SDN controller 132 maintains routing, networking, and configuration information within a state database.

In one example approach, network analysis system 140 interacts with one or more of network devices 110 (and/or other devices) to collect flow data across data center 101 and/or network system 100. In one such example approach, network devices 110 are configured as an underlay infrastructure used to support one or more overlay networks. In such an example approach, flow data may include underlay flow data and overlay flow data. In some examples, the underlay flow data may be collected through samples of flow data collected at Layer 2 of the OSI model. Overlay flow data may be data (e.g., samples of data) derived from overlay traffic across one or more virtual networks established within network system 100. Overlay flow data may, for example, include information identifying a source virtual network and a destination virtual network.

In one example approach, devices 110 are configured to collect flow data. In one such example approach, one or more devices such as network analysis system 140 and/or SDN controller 132 outputs configuration signals to each of devices 110 configuring the devices 110 to collect flow data, including underlay flow data and/or overlay flow data. Thereafter, each of devices 110 communicates underlay flow data and/or overlay flow data to network analysis system 140 as data packets are processed by each of devices 110. Network analysis system 140 receives the flow data, prepares it to be used in response to analytical queries, and stores the flow data. In the example of FIG. 1A, other network devices, including network devices within switch fabric 121 (and not specifically shown), may also be configured to collect underlay and/or overlay flow data.

As noted above, network analysis system 140 processes queries regarding the flow data. For instance, in one example, user interface device 129 detects input and transfers information about the input to network analysis system 140. Network analysis system 140 determines that the information corresponds to a request for information about network system 100 from a user of user interface device 129. Network analysis system 140 processes the request by querying stored flow data. Network analysis system 140 generates a response to the query based on the stored flow data, and outputs information about the response to user interface device 129.

In some examples, the request received from user interface device 129 may include a source and/or destination virtual network identifier. In such an example, the network analysis system 140 may, in response to such a request, identify one or more likely data paths over underlay network devices that packets traveling from the source virtual network to the destination virtual network may have taken. To identify the likely data paths, network analysis system 140 may correlate the collected overlay flow data with the collected underlay flow data so that the underlay network devices used by an overlay data flow can be identified.

Figure 1B:
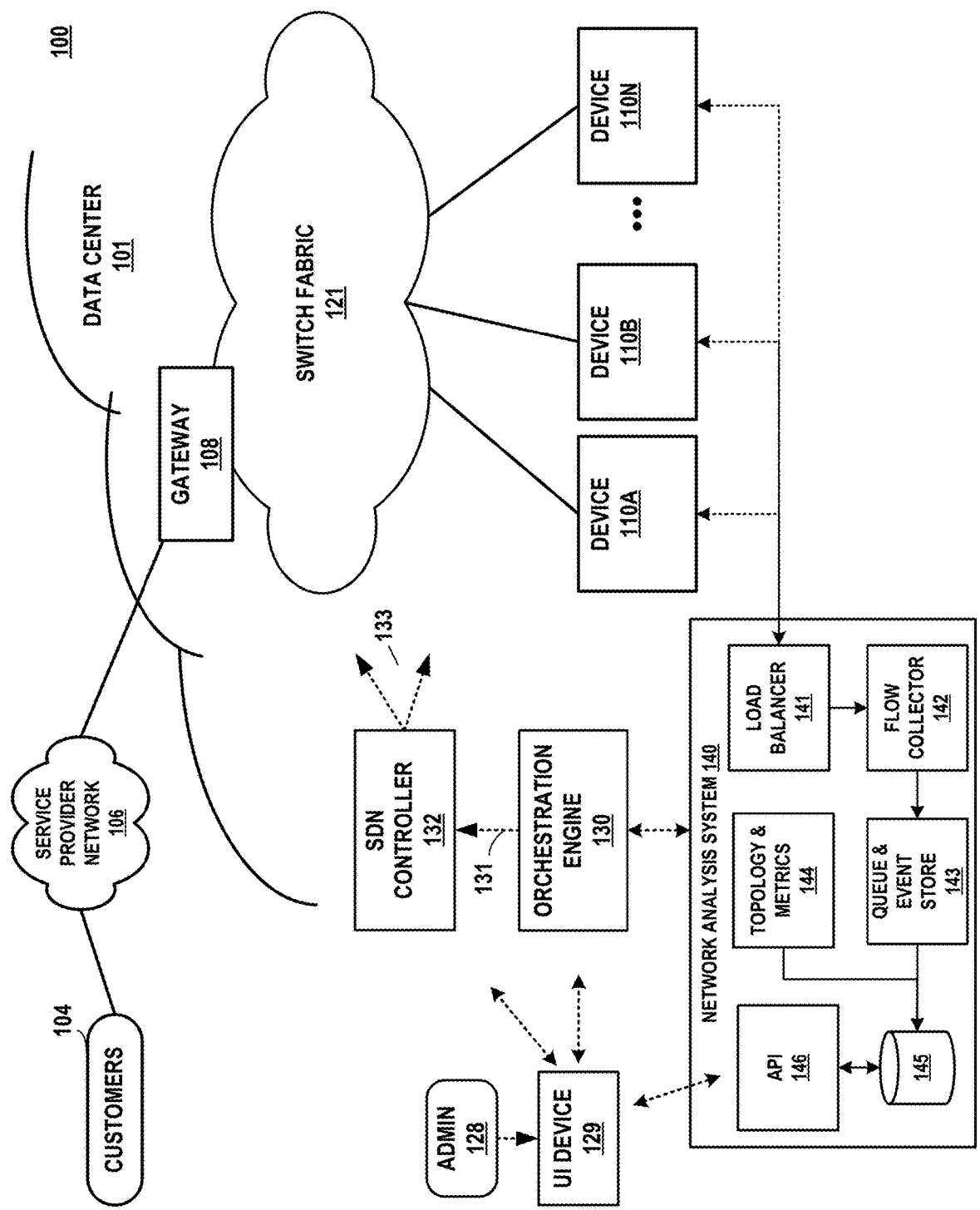

FIG. 1B is a conceptual diagram illustrating an example system that includes a data center and a network analysis system used to analyze traffic flows across and/or within the data center, in accordance with one or more aspects of the present disclosure. FIG. 1B includes many of the same elements described in connection with FIG. 1A; elements illustrated in FIG. 1B that are identified by the same reference numeral in FIG. 1A are similar. In general, such like-numbered elements may be implemented in a manner consistent with the description of the corresponding element provided in connection with FIG. 1A, although in some examples, such elements may involve alternative implementation with more, fewer, and/or different capabilities and attributes.

FIG. 1B illustrates various components of network analysis system 140. In the example shown in FIG. 1B, network analysis system 140 includes load balancer 141, flow collector 142, queue & event store 143, topology & metrics source 144, data store 145 and flow API 146. In general, network analysis system 140 and the components 141-146 of network analysis system 140 are designed and/or configured to ensure high availability and an ability to process a high volume of flow data. In some examples, multiple instances of components 141-146 of network analysis system 140 may be orchestrated (e.g., by orchestration engine 130) to execute on different physical servers to ensure that there is no single point of failure for any component of network analysis system 140. In some examples, network analysis system 140 or components thereof may be scaled independently and horizontally to enable efficient and/or effective processing of a desired volume of traffic (e.g., flow data).

Network analysis system 140 of FIG. 1B may, as in FIG. 1A, configure each of devices 110 to collect flow data. For instance, network analysis system 140 may output a signal to each of devices 110 to configure each of devices 110 to collect flow data, including underlay flow data and overlay flow data. One or more of devices 110 may thereafter collect underlay flow data and overlay flow data and report such flow data to network analysis system 140.

In the example shown in FIG. 1B, load balancer 141 receives the flow data from each of devices 110. In one such example approach, load balancer 141 may distribute the traffic across multiple flow collectors 142 to ensure an active/active failover strategy for the flow collectors 142. In some examples, multiple load balancers 141 may be required to ensure high availability and scalability.

In the example shown in FIG. 1B, flow collector 142 collects data from load balancer 141. For example, flow collector 142 of network analysis system 140 receives and processes flow packets from each of devices 110 (after processing by load balancer 141). Flow collector 142 sends the flow packets upstream to queue & event store 143. In some examples, flow collector 142 may address, process, and/or accommodate unified data from sFlows, NetFlow v9, IPFIX, jFlow, Contrail Flow, and other formats. The sFlow technology is a monitoring technology for high-speed switched or routed networks. sFlow monitoring technology collects samples of network packets and sends them in a UDP datagram to a flow collector 142. Flow collector 142 may, for instance, be capable of parsing the inner header from sFlow packets and other data flow packets. Flow collector 142 may also be able to handle message overflows, enriched flow records with topology information (e.g., App-Formix topology information) and other aspects of flow data analysis. In one example approach, flow collector 142 converts data to binary format before writing or otherwise sending data to queue & event store 143. Underlay flow data of the "sFlow" type (which refers to a "sampled flow") is a standard for packet export at Layer 2 of the OSI model. It provides a means for exporting truncated packets, together with interface counters for the purpose of network monitoring.

In one example approach, queue & event store 143 processes the data processed by flow collector(s) 142. For example, queue & event store 143 may receive data from one or more flow collectors 142, store the data, and make the data available for ingestion in data store 145. In some examples, this enables separation of the task of receiving and storing large volumes of data from the task of indexing the data and preparing it for analytical queries.

In some examples, queue & event store 143 also allows independent users to directly consume the stream of flow records. In some examples, queue & event store 143 may be used to discover anomalies and produce alerts in real time. In some examples, flow data may be parsed by reading encapsulated packets, including VXLAN, MPLS over UDP, and MPLS over GRE, to extract additional information. In one such example approach, queue & event store 143 parses the inner (overlay) packet to obtain the source IP address, destination IP address, source port, destination port, and protocol. Some types of flow data (including sFlow data) include only a fragment of sampled network traffic (e.g., the first 128 bytes in sFlow), so in some cases, the flow data might not include all of the inner fields. In one example approach, such fields are marked as missing.

Topology & metrics source 144 may enrich or augment the data with topology information and/or metrics information. For example, topology & metrics source 144 may provide network topology metadata, which may include identified nodes or network devices, configuration information, configuration, established links, and other information about such nodes and/or network devices. In some examples, topology & metrics source 144 may use AppFormix topology data or may include an executing AppFormix module. The information received from topology & metrics source 144 may be used to enrich flow data collected by flow collector 142 and support flow API 146 in processing queries of data store 145.

In one example, data store 145 is configured to store data received from queue & event store 143 and from topology & metrics source 144 in an indexed format, enabling fast aggregation queries and fast random-access data retrieval. In some examples, data store 145 may achieve fault tolerance and high availability by sharding and replicating the data.

Flow API 146 may process query requests sent by one or more user interface devices 129. For instance, in some examples, flow API 146 may receive a query request from user interface device 129 through an HTTP POST request. In such an example, flow API 146 converts information included within the request to a query for data store 145. To create the query, flow API 146 may use topology information from topology & metrics source 144. In some example approaches, flow API 146 may use one or more of such queries to perform analytics on behalf of user interface device 129. Such analytics may include traffic deduplication, overlay-underlay correlation, traffic path identification, and/or heatmap traffic calculation. Such analytics may also involve correlating the underlay flow data with the overlay flow data, thereby enabling identification of which underlay network devices are relevant to traffic flowing over a virtual network and/or between two virtual machines.

Through techniques in accordance with one or more aspects of the present disclosure, such as by correlating underlay flow data with overlay flow data, network analysis system 140 may be able to determine, for a given data flow, which tenant the data flow belongs to in a multitenant data center. Further, network analysis system 140 may also be able to determine which virtual computing instances (e.g., virtual machines or containers) are source and/or destination virtual computing instances for such a flow. Still further, correlating underlay flow data with overlay flow data, such as by enriching the underlay flow data with overlay flow data, may facilitate troubleshooting of performance or other issues that may arise in network system 100.

For instance, in some cases, a connectivity problem may arise during a timeframe where limited information is available, but where information about the source and destination virtual networks is known. Troubleshooting such a problem can be challenging, since it may be difficult to pinpoint what physical path the data flow took through the network, given the source and destination virtual networks. Since the actual physical path through the underlay infrastructure might not otherwise be readily known, there could be many network devices or physical links that are a potential cause of the connectivity problem. However, by collecting underlay and overlay flow data, and enriching the underlay flow data with the overlay flow data collected during the same time period, it may be possible to identify which underlay network devices processed the data flow and to identify the physical links traversed by the data flow, thereby enabling a determination of the data path the data flow took through data center 101 or, at least, a determination of likely data paths for such a data flow. Accordingly, troubleshooting such a connectivity issue may proceed more efficiently, at least because the number of underlay network devices 110 pertinent to the connectivity problem can be substantially reduced through such analysis.

Figure 2:
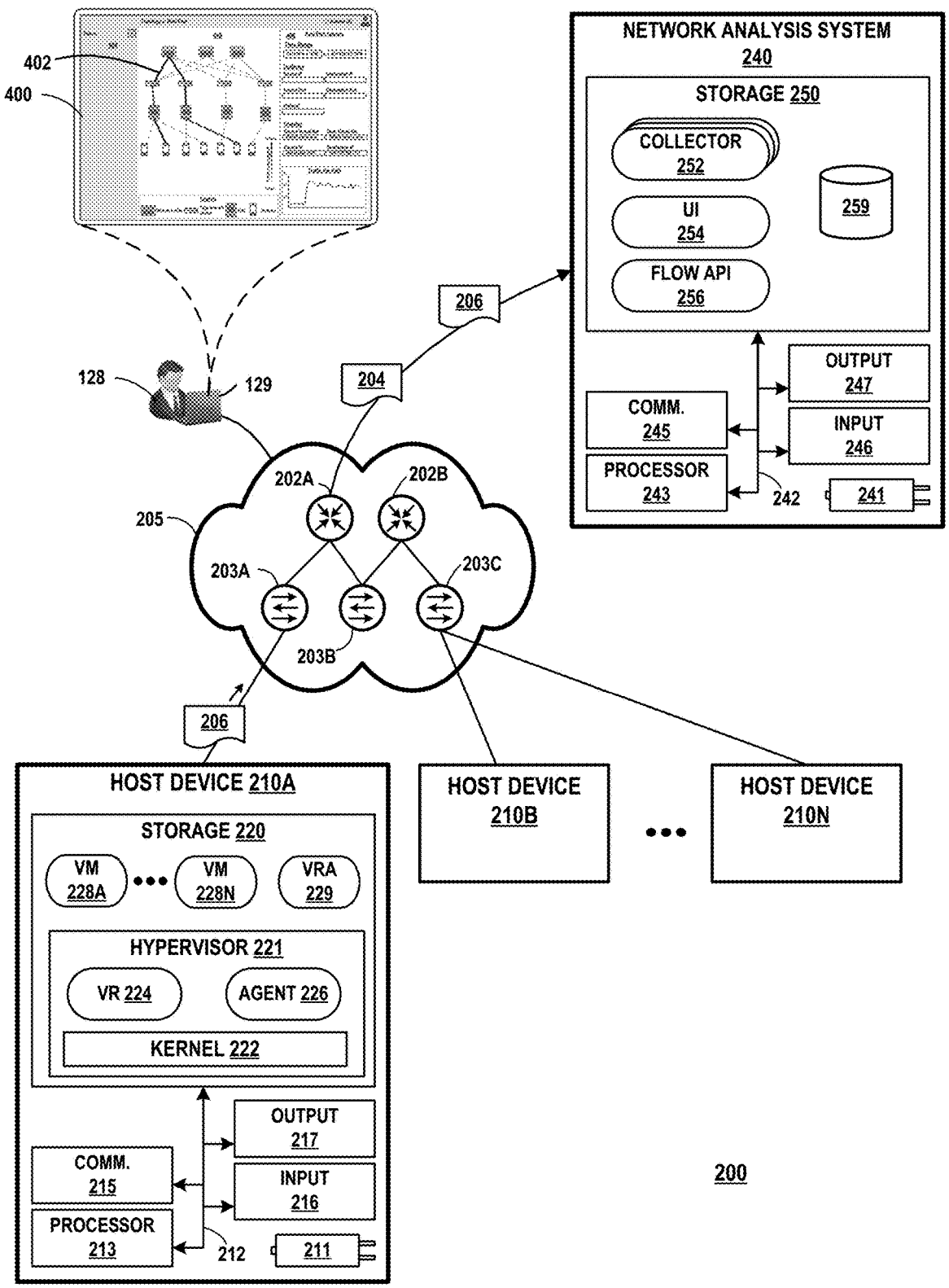
FIG. 2 is a block diagram illustrating an example system that includes a data center and a network analysis system used to analyze traffic flows across and/or within the data center, in accordance with one or more aspects of the present disclosure.

FIG. 2 is a block diagram illustrating an example system that includes a data center and a network analysis system used to analyze traffic flows across and/or within the data center, in accordance with one or more aspects of the present disclosure. Network system 200 of FIG. 2 may be described as an example or alternative implementation of network system 100 of FIG. 1A or of network system 100 of FIG. 1B. One or more aspects of FIG. 2 may be described herein within the context of FIGS. 1A and 1B.

Although a data center, such as that illustrated in FIG. 1A, FIG. 1B, and FIG. 2 may be operated by any entity, some data centers 101 are operated by a service provider, where the business model of such a service provider is to provide computing capacity to its clients. For this reason, data centers 101 usually contain a huge number of compute nodes, or host devices. In order to operate efficiently, those hosts may need to be connected to each other and to the external world; that ability is provided through the physical network devices 110 shown, for instance, in FIGS. 1A and 1B, which may be interconnected in a leaf-spine topology. The collection of these physical devices, such as network devices and hosts, form an underlay network.

Each host device in such a data center may have two or more virtual machines running on the device; the combination of virtual machines and other tasks executing on each host device 210 is the device's workload. Clients of the data center usually have access to these workloads and can install applications and perform other operations using such workloads. Workloads that run on different host devices but are accessible by one client are organized into a virtual network. Each client usually has at least one virtual network. Those virtual networks are also called overlay networks. In some cases, a client of the data center may experience connectivity issues between two applications that are running on different workloads. Troubleshooting such issues tends to be complicated by the deployment of the workloads in a large multi-tenant data center.

In the example of FIG. 2, network analysis system 240 connects to host devices 210A-210N via a network 205. In some example approaches, network analysis system 240 may correspond to an example or alternative implementation of network analysis system 140 illustrated in FIG. 1A and FIG. 1B. Host devices 210A, 210B, through 210N may be collectively referenced as "host devices 210," representing any number of host devices 210. Each of host devices 210 may be an example of devices 110 of FIG. 1A and FIG. 1B, but in the example of FIG. 2, each of host devices 210 is implemented as a server or host device that operates as a compute node of a virtualized data center, as opposed to simply a network device. Thus, in the example of FIG. 2, each of host devices 210 executes multiple virtual computing instances, such as virtual machines 228A-228N, collectively known as "virtual machines 228".

In one example, network 205 is implemented as a leaf-spine topology, in which network devices designated as leaf devices 203 are connected to network devices designated as spine devices 202. In one such example approach, such as shown in FIG. 2, spine devices 202A and 202B (collectively "spine devices 202" and representing any number of spine devices 202), are connected to leaf device 203A, 203B, and leaf device 203C (collectively "leaf devices 203" and also representing any number of leaf devices 203). Although network 205 is illustrated with spine devices 202 and leaf devices 203, other types of network devices may be included in network 205, including core switches, edge network devices, top-of-rack devices, and other network devices.

In the example shown in FIG. 2, user interface device 129, which may be operated by administrator 128, as in FIG. 1A and FIG. 1B, is also connected through network 205 to network analysis system 240. In some examples, user interface device 129 may present, at a display device associated with user interface device 129, one or more graphical user interfaces, some of which may have a form similar that shown in user interface 400.

FIG. 2 illustrates underlay flow data 204 and overlay flow data 206 flowing to network analysis system 240 over network 205. In this example, underlay flow data 204 is shown leaving spine 202A of network 205 and flowing to network analysis system 240. Similarly, overlay flow data 206 is shown leaving host device 210A and flowing through network 205 to network analysis system 240. For simplicity, FIG. 2 illustrates a single instance of underlay flow data 204 and a single instance of overlay flow data 206. However, it should be understood that each of spine devices 202 and leaf devices 203 may generate and communicate underlay flow data 204 to network analysis system 240, and in some examples, each of host devices 210 (and/or other devices) may generate underlay flow data 204 and communicate such data across network 205 to network analysis system 240. Further, each of host devices 210 (and/or other devices) may generate overlay flow data 206 and communicate such data over network 205 to network analysis system 240.

Network 205 may correspond to any of switch fabric 121 and/or service provider network 106 of FIG. 1A and FIG. 1B, or alternatively, may correspond to a combination of switch fabric 121, service provider network 106, and/or another network. Network 205 may also include some of the components of FIG. 1A and FIG. 1B, including gateway 108, SDN controller 132, and orchestration engine 130.

In general, network 205 may be the internet, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Network analysis system 240 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, network analysis system 240 represents a cloud computing system, server farm, and/or server cluster (or portion thereof) that provides services to client devices and other devices or systems. In other examples, network analysis system 240 may represent or be implemented through one or more virtualized compute instances (e.g., virtual machines, containers) of a data center, cloud computing system, server farm, and/or server cluster.

In the example of FIG. 2, network analysis system 240 may include power source 241, one or more processors 243, one or more communication units 245, one or more input devices 246, and one or more output devices 247. Storage devices 250 may include one or more collector modules 252, a user interface module 254, a flow API 256, and a data store 259.

One or more of the devices, modules, storage areas, or other components of network analysis system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Power source 241 may provide power to one or more components of network analysis system 240. Power source 241 may receive power from the primary alternating current (AC) power supply in a data center, building, home, or other location. In other examples, power source 241 may be a battery or a device that supplies direct current (DC). In still further examples, network analysis system 240 and/or power source 241 may receive power from another source. One or more of the devices or components illustrated within network analysis system 240 may be connected to power source 241, and/or may receive power from power source 241. Power source 241 may have intelligent power management or consumption capabilities, and such features may be controlled, accessed, or adjusted by one or more modules of network analysis system 240 and/or by one or more processors 243 to intelligently consume, allocate, supply, or otherwise manage power.

One or more processors 243 of network analysis system 240 may implement functionality and/or execute instructions associated with network analysis system 240 or associated with one or more modules illustrated herein and/or described herein. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Network analysis system 240 may use one or more processors 243 to perform operations in accordance with one or more aspects of the present disclosure using software, hardware, firmware, or a mixture of hardware, software, and firmware residing in and/or executing at network analysis system 240.

One or more communication units 245 of network analysis system 240 may communicate with devices external to network analysis system 240 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of network analysis system 240 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of network analysis system 240 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator).

One or more storage devices 250 within network analysis system 240 may store information for processing during operation of network analysis system 240. Storage devices 250 may also store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of network analysis system 240 and/or one or more devices or systems illustrated as being connected to network analysis system 240.

In some examples, one or more storage devices 250 are implemented through temporary memory, which may mean that a primary purpose of the one or more storage devices is not long-term storage. Storage devices 250 of network analysis system 240 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

In one example approach, collector module 252 may perform functions relating to receiving both underlay flow data 204 and overlay flow data 206, and perform load balancing as necessary to ensure high availability, throughput, and scalability for collecting such flow data. Collector module 252 may process the data in order to prepare the data for storage within data store 259. In some examples, collector module 252 may store the data within data store 259.

User interface module 254 may perform functions relating to generating user interfaces for presenting the results of analytical queries performed by flow API 256. In some examples, user interface module 254 may generate information sufficient to generate a set of user interfaces, and cause communication unit 215 to output such information over network 205 for use by user interface device 129 to present one or more user interfaces at a display device associated with user interface device 129.

Flow API 256 may perform analytical queries involving data stored in data store 259 that is derived from the collection by collector module 252 of underlay flow data 204 and overlay flow data 206. In some examples, flow API 256 may receive a request in the form of information derived from an HTTP POST request, and in response, may convert the request into a query to be executed on data stored in data store 259. Further, in some examples, flow API 256 may fetch topology information pertaining to the device 110, and perform analytics that include data deduplication, overlay-underlay correlation, traffic path identification, and heatmap traffic calculation.

Data store 259 may represent any suitable data structure or storage medium for storing information related to data flow information, including storage of data derived from underlay flow data 204 and overlay flow data 206. Data store 259 may be used to store data in an indexed format, enabling fast data retrieval and execution of queries. The information stored in data store 259 may be searchable and/or categorized such that one or more modules within network analysis system 240 may provide an input requesting information from data store 259, and in response to the input, receive information stored within data store 259. Data store 259 may be primarily maintained by collector module 252. Data store 259 may be implemented through multiple hardware devices, and may achieve fault tolerance and high availability by sharding and replicating data. In some examples, aspects of data store 259 may be implemented using the open source ClickHouse column-oriented database management system.

As noted above, each of host devices 210 represents a physical computing device or compute node that provides an execution environment for virtual hosts, virtual machines, containers, and/or other virtualized computing resources. In some examples, each of host devices 210 may be a component of a cloud computing system, server farm, and/or server cluster (or portion thereof) that provides services to client devices and other devices or systems.

Certain aspects of host devices 210 are described herein with respect to host device 210A. Other host devices 210 (e.g., host device 210B through 210N) may be described similarly, and may also include the same, similar, or corresponding components, devices, modules, functionality, and/or other features. Descriptions herein with respect to host device 210A may therefore correspondingly apply to one or more other host devices 210 (e.g., any of host devices 210B through 210N).

In the example of FIG. 2, host device 210A includes underlying physical compute hardware that includes power source 211, one or more processors 213, one or more communication units 215, one or more input devices 216, one or more output devices 217, and one or more storage devices 220. Storage devices 220 may include hypervisor 221, including kernel module 222, virtual router module 224, and agent module 226. Virtual machines 228A through 228N (collectively "virtual machines 228" and representing any number of virtual machines 228) execute on top of hypervisor 221 or are controlled by hypervisor 221. Similarly, virtual router agent 229 may execute on, or under the control of, hypervisor 221. One or more of the devices, modules, storage areas, or other components of host device 210 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of host device 210. Processor 213 may implement functionality and/or execute instructions associated with host device 210 and hypervisor 221. Communication unit 215 may communicate with other devices or systems on behalf of host device 210. One or more input devices 216 and output devices 217 may represent any other input and/or output devices associated with host device 210. Storage devices 220 may store information for processing during operation of host device 210A. Each of such components may be implemented in a manner like those described herein in connection with network analysis system 240 or otherwise.

Hypervisor 221 may serve as a module or system that instantiates, creates, and/or executes one or more virtual machines 228 on an underlying host hardware device. In some contexts, hypervisor 221 may be referred to as a virtual machine manager (VMM). Hypervisor 221 may execute within the execution environment provided by storage devices 220 and processors 213 or on top of an operating system kernel (e.g., kernel module 222). In some examples, hypervisor 221 is an operating system-level component that executes on a hardware platform (e.g., host 210) to provide a virtualized operating environment and orchestration controller for virtual machines 228, and/or other types of virtual computing instances. In other examples, hypervisor 221 may be a software and/or firmware layer that provides a light-weight kernel and operates to provide a virtualized operating environment and orchestration controller for virtual machines 228, and/or other types of virtual computing instances. Hypervisor 221 may incorporate the functionality of kernel module 222 (e.g., as a "type 1 hypervisor"), as shown in FIG. 2. In other examples, hypervisor 221 may execute on a kernel (e.g., as a "type 2 hypervisor").

Virtual router module 224 may execute multiple routing instances for corresponding virtual networks within data center 101 and may route packets to appropriate virtual machines executing within the operating environment provided by devices 110. Virtual router module 224 may also be responsible for collecting overlay flow data, such as Contrail Flow data when used in an infrastructure in which the Contrail SDN is employed. Accordingly, each of host devices 210 may include a virtual router. Packets received by virtual router module 224 of host device 210A, for instance, from the underlying physical network fabric may include an outer header to allow the physical network fabric to tunnel the payload or "inner packet" to a physical network address for a network interface of host device 210A. The outer header may include not only the physical network address of the network interface of the server but also a virtual network identifier such as a VxLAN tag or Multi-protocol Label Switching (MPLS) label that identifies one of the virtual networks as well as the corresponding routing instance executed by the virtual router. An inner packet includes an inner header having a destination network address that conforms to the virtual network addressing space for the virtual network identified by the virtual network identifier.

In one example approach, agent module 226 may execute as part of hypervisor 221. In another example approach, agent module 226 may execute within kernel space or as part of kernel module 222. Agent module 226 may monitor some or all the performance metrics associated with host device 210A, and may implement and/or enforce policies, which may be received from a policy controller (not shown in FIG. 2). Agent module 226 may configure virtual router module 224 to communicate overlay flow data to network analysis system 240.

Virtual machine 228A through virtual machine 228N (collectively "virtual machines 228," representing any number of virtual machines 228) may represent example instances of virtual machines 228. Host device 210A may partition the virtual and/or physical address space provided by storage device 220 into user space for running user processes. Host device 210A may also partition virtual and/or physical address space provided by storage device 220 into kernel space, which is protected and may be inaccessible by user processes.

In general, each of virtual machines 228 may be any type of software application and each may be assigned a virtual address for use within a corresponding virtual network, where each of the virtual networks may be a different virtual subnet provided by virtual router module 224. Each of virtual machines 228 may be assigned its own virtual layer three (L3) IP address, for example, for sending and receiving communications but is unaware of an IP address of the physical server on which the virtual machine is executing. In this way, a "virtual address" is an address for an application that differs from the logical address for the underlying, physical computer system, e.g., host device 210A in the example of FIG. 2.

Each of virtual machines 228 may represent a tenant virtual machine running customer applications such as Web servers, database servers, enterprise applications, or hosting virtualized services used to create service chains. In some cases, any one or more of host devices 210 or another computing device hosts customer applications directly, i.e., not as virtual machines. Although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on host devices 210.

Virtual router agent 229 is included within host device 210A in the example of FIG. 2 and may communicate with SDN controller 132 and virtual router module 224 so as to control the overlay of virtual networks and coordinate the routing of data packets within host device 210A. In general, virtual router agent 229 communicates with SDN controller 132, which generates commands to control routing of packets through data center 101. Virtual router agent 229 may execute in user space and operate as a proxy for control plane messages between virtual machines 228 and SDN controller 132. For example, virtual machine 228A may request to send a message using its virtual address via virtual router agent 229, and virtual router agent 229 may in turn send the message and request that a response to the message be received for the virtual address of virtual machine 228A, which originated the first message. In some cases, virtual machine 228A may invoke a procedure or function call presented by an application programming interface of virtual router agent 229, and in such an example, virtual router agent 229 handles encapsulation of the message as well, including addressing.

Network analysis system 240 may configure each of spine devices 202 and leaf devices 203 to collect underlay flow data 204. For instance, in an example that can be described with reference to FIG. 2, collector module 252 of network analysis system 240 causes communication unit 215 to output one or more signals over network 205. Each of spine devices 202 and leaf devices 203 detect a signal and interpret the signal as a command to enable collection of underlay flow data 204. For example, upon detecting a signal from network analysis system 240, spine device 202A configures itself to collect sFlow data and communicate the sFlow data (as underlay flow data 204) over network 205 to network analysis system 240. As another example, upon detecting a signal from network analysis system 240, leaf device 203A detects a signal and configures itself to collect sFlow data and communicate the sFlow data over network 205 to network analysis system 240. Further, in some examples, each of host devices 210 may detect a signal from network analysis system 240, and interpret the signal as a command to enable collection of sFlow data. Accordingly, in some examples, sFlow data may be collected by collector modules executing on host devices 210.

Accordingly, in the example being described, spine devices 202, leaf devices 203 (and possibly one or more of host devices 210) collect sFlow data. In other examples, however, one or more of such devices may collect other types of underlay flow data 204, such as IPFIX and/or NetFlow data. Collecting any such underlay flow data may involve collection of a five-tuple of data that includes the source and destination IP address, the source and destination port number, and the network protocol being used.

Network analysis system 240 may configure each of host devices 210 to collect overlay flow data 206. For instance, continuing with the example being described with reference to FIG. 2, collector module 252 causes communication unit 215 to output one or more signals over network 205. Each of host devices 210 detect a signal that is interpreted as a command to collect overlay flow data 206 and communicate the overlay flow data 206 to network analysis system 240. For example, with reference to host device 210A, communication unit 215 of host device 210A detects a signal over network 205 and outputs information about the signal to hypervisor 221. Hypervisor 221 outputs information to agent module 226. Agent module 226 interprets the information from hypervisor 221 as a command to collect overlay flow data 206. Agent module 226 configures virtual router module 224 to collect overlay flow data 206 by sampling network traffic and to communicate the overlay flow data 206 to network analysis system 240.

Overlay flow data 206 includes, in at least some examples, a five-tuple of information about the source and destination addresses, source and destination ports, and protocol. In addition, overlay flow data 206 may include information about the virtual networks associated with the overlay data flow, including the source virtual network and the destination virtual network. In some examples, particularly for a network configured using the Contrail SDN available from Juniper Networks of Sunnyvale, Calif., overlay flow data 206 may correspond to Contrail Flow data.

In the example being described, agent module 226 configures virtual router module 224 to collect overlay flow data 206. In other examples, however, hypervisor 221 may configure virtual router module 224 to collect overlay flow data 206. Further, in other examples, overlay flow data 206 data may be collected by another module (alternatively or in addition), such as agent module 226 or even by hypervisor 221 or kernel module 222. Accordingly, in some examples, host devices 210 may collect both underlay flow data (sFlow data) and overlay flow data (e.g., Contrail Flow data).

Network analysis system 240 may receive both underlay flow data 204 and overlay flow data 206. For instance, continuing with the example and with reference to FIG. 2, spine device 202A samples, detects, senses, and/or collects underlay flow data 204. Spine device 202A outputs a signal over network 205. Communication unit 215 of network analysis system 240 detects a signal from spine device 202A and outputs information about the signal to collector module 252. Collector module 252 determines that the signal includes information about underlay flow data 204.

Similarly, in some example approaches, virtual router module 224 of host device 210A samples, detects, senses, and/or collects overlay flow data 206 at host device 210A. Virtual router module 224 causes communication unit 215 of host device 210A to output a signal over network 205. Communication unit 215 of network analysis system 240 detects a signal from host device 210A and outputs information about the signal to collector module 252. Collector module 252 determines that the signal includes information about overlay flow data 206.

Network analysis system 240 may process both underlay flow data 204 and overlay flow data 206 received from various devices within network system 200. For instance, continuing with the same example, collector module 252 processes the signals received from spine device 202A, host device 210A, and other devices by distributing the signals across multiple collector modules 252. In some examples, each of collector modules 252 may execute on a different physical server, and may be scaled independently and horizontally to handle the desired volume or peak capacity of flow traffic from spine devices 202, leaf devices 203, and host devices 210. Each of collector modules 252 stores each instance of underlay flow data 204 and overlay flow data 206 and makes the stored data available for ingestion in data store 259. In some example approaches, collector module 252 indexes the data and prepares the data for use with analytical queries.

Network analysis system 240 may store underlay flow data 204 and overlay flow data 206 in data store 259. For instance, in FIG. 2, collector module 252 outputs information to data store 259. Data store 259 determines that the information corresponds to underlay flow data 204 and overlay flow data 206. Data store 259 stores the data in indexed format, enabling fast aggregation queries and fast random-access data retrieval. In some examples, data store 259 may achieve fault tolerance and high availability by sharding and replicating the data across multiple storage devices, which may be located across multiple physical hosts.

Network analysis system 240 may receive a query. For instance, continuing with the same example and with reference to FIG. 2, user interface device 129 detects input and outputs, over network 205, a signal derived from the input. Communication unit 215 of network analysis system 240 detects a signal and outputs information about the signal to flow API 256. Flow API 256 determines that the signal corresponds to a query from a user of user interface device 129 for information about network system 200 for a given time window. For example, a user of user interface device 129 (e.g., administrator 128) may have noticed that a particular virtual machine within a particular virtual network seems to be dropping packets at an unusual rate, and may seek to troubleshoot the problem. One way to troubleshoot the problem is to identify which network devices (e.g., which underlay routers) are on the data path that seems to be dropping packets. Accordingly, administrator 128 may seek to identify a likely path taken between a source and destination virtual machine by querying network analysis system 240.

Network analysis system 240 may process the query. For instance, again continuing with the example being described in the context of FIG. 2, flow API 256 determines that the signal received from user interface device 129 includes information about a source and/or destination virtual network. Flow API 256 queries data store 259 by enriching the underlay flow data stored within data store 259 to include the virtual network data from the overlay flow data from the time window identified in the query. To perform the query, flow API 256 narrows the data down to the specified time window and for each relevant underlay flow data 204 record, flow API 256 adds any source and/or destination virtual network information from overlay flow data 206 records that have values matching those of a corresponding underlay flow data 204 record. Flow API 256 identifies one or more network devices identified by the enriched underlay flow data. Flow API 256 determines, based on the identified network devices, one or more likely paths taken between the specified source and destination virtual networks. In some examples, a global join technique (e.g., available in ClickHouse database management systems) can be used for enrichment. In such an example, flow API 256 gathers overlay flow data and broadcasts such data to all the nodes. The data is then used as a lookup table, independently for each node. To minimize the size of the table, flow API 256 may perform predicate pushdown of the filtering criteria to the subqueries.

Network analysis system 240 may generate and display a user interface 400 illustrating a likely path 402 between the source and destination virtual network to be presented at user interface device 129. Flow API 256 outputs information about the determined likely paths to user interface module 254. User interface module 254 uses the information from flow API 256 to generate data sufficient to create a user interface presenting information about likely paths between the source and destination virtual networks. User interface module 254 causes communication unit 215 to output a signal over network 205. User interface device 129 detects a signal over network 205 and determines that the signal includes information sufficient to generate a user interface. User interface device 129 generates a user interface (e.g., user interface 400) and presents it at a display associated with user interface device 129. In some examples, user interface 400 presents information illustrating one or more possible paths 402 between virtual machines 228, and may include information about how much data is or has been communicated between those virtual machines 228.

Modules illustrated in FIG. 2 (e.g., virtual router module 224, agent module 226, collector module 252, user interface module 254, flow API 256) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

As noted above, administrators need tools that let them identify the underlay network devices that are relevant to traffic flowing over a virtual network and/or between two virtual machines. Tools such as sFlow that sample underlay data flows do not, however, provide information sufficient to tie the sampled underlay data flows to specific overlay networks. For instance, although the outer header in an sFlow sample may identify one of the virtual networks, there is no indication whether the identified virtual network is the source virtual network or the destination virtual network. Network analysis system 240 cannot, therefore, identify the segment of the path between the network device and the host. Techniques for identifying the overlay networks associated with an underlay data flow will be discussed next. A first approach adds information to overlay flow data identifying a source and destination virtual network for each overlay data flow. A second approach uses encapsulation attributes to identify the virtual network between the host and the network device.

As noted above, one approach for identifying the overlay networks associated with an underlay data flow adds information to overlay flow data identifying a source and destination virtual network for each overlay data flow. In one example approach, a virtual router adds a VXLAN Network ID (VNI) identifying the source virtual network and a VNI identifying the destination virtual network to the overlay flow data. The overlay flow data is then correlated with the underlay flow data to identify a source virtual network and a destination virtual network for each underlay data flow. The combination of the underflow flow data and the source and destination overlay network information may then be used to determine a complete path through the underlay network from the source overlay network to the destination overlay network. In one example approach, network analysis system 240 adds the identities of the source and destination virtual networks to each sFlow data sample to form an enriched underlay data flow sample before storing the enriched underlay data flow sample to a database.

FIG. 3 is a conceptual diagram illustrating an example query executing on stored underlay and overlay flow data, in accordance with one or more aspects of the present disclosure. FIG. 3 illustrates data table 301, query 302, and output table 303. Data table 301 illustrates records of both underlay and overlay flow data that might be stored within data store 259 of FIG. 2. Query 302 represents a query that may be generated by flow API 256 in response to a request received by network analysis system 240 from user interface device 129. Output table 303 represents data generated from data table 301 in response to executing query 302.

As noted above, packets received by a virtual router module 224 from the underlying physical network fabric may include an outer header used to allow the physical network fabric to tunnel the payload or "inner packet" to a physical network address for a network interface of the host device 210 hosting the virtual router module 224. An inner packet includes an inner header having a destination network address that conforms to the virtual network addressing space for the virtual network identified by the virtual network identifier. In one example approach, flow collector 142 is capable of parsing both the inner and outer header from sFlow packets and other data flow packets.

In the example shown in FIG. 3, data table 301 displays only a subset of the information received from sFlow packets and other data flow packets. For instance, data store 259 of FIG. 2 may include, for each sFlow, the underlay source and destination IP address, the underlay source port and destination port, and the source or destination VXLAN Network ID (VNI) (if present), none of which are shown in data table 301.

In the example of FIG. 3, and in accordance with one or more aspects of the present disclosure, network analysis system 240 of FIG. 2 may populate data table 301. For instance, with reference to both FIG. 2 and FIG. 3, network analysis system 240 collects both underlay flow data 204 and overlay flow data 206 from various devices within network system 200. Collector module 252 of network analysis system 240 stores the collected data in memory, such as storage 250, data store 259 or cache. In the example of FIG. 3, the data stored within memory corresponds to data table 301.

Flow API 256, in one example approach, selects rows from data table 301 that identify a network device, such as rows 1, 3, and 5. Flow API 256 then attempts to find overlay flow data records that match the underlay flow data. In one example approach, flow API 256 of network analysis system 240 determines whether any of the overlay flow data rows (e.g., rows 2, 4, 6 and 7) have the same five-tuple data (i.e., overlay source and destination address and port number, and protocol) as rows 1, 3 and 5. Flow API 256 determines, for instance, that the overlay data from row 6 has five-tuple data matching that of row 3. Accordingly, flow API 256 determines that the source virtual network for device "a7" is source virtual network "e" (see "src vn" column of row 1 of output table 303). Similarly, flow API 256 may determine that the overlay data from row 4 of data table 301 has five-tuple data matching that of row 5 of data table 301. Accordingly, flow API 256 may determine that the source virtual network for device "a8" is source virtual network "c" (see row 2 of output table 303).

In one example approach, flow API 256 selects rows from data table 301 that have a timestamp within a range and matches the underlay data rows to overlay data flow rows that fall within the same timeframe, such as greater than or equal to 7 and less than or equal to 9. In the example illustrated in FIG. 3, flow API 256 identifies two network devices satisfying the criteria: network device "a7" (from row 3 of data table 301) and network device "a8" (from row 5 of data table 301).

Where more than one instance (row) of overlay flow data is available and matches the 5-tuple of an underlay flow data row, any or all such data can be used to identify a source virtual network. This assumes that the virtual network configuration changes infrequently. In the example shown in FIG. 3, for instance, flow API 256 determines that the source virtual network for device "a8" may be either source virtual network "c" (see row 4 of data table 301) or source virtual network "g" (see row 7 of data table 301). Flow API 256 may then select either source virtual network "c" or "g" as the source virtual network.

In some examples, the outer header in an sFlow sample may include not only the physical network address of the network interface of the host device 210 but also virtual network identification such as a VxLAN tag or Multiprotocol Label Switching (MPLS) label that identifies one of the virtual networks. In one such example approach, network analysis system 240 uses overlay flow information generated by vRouter agent 229 and underlay flow information received via sFlow to find the path of a flow between any one Virtual Machine 228 and another Virtual Machine 228.

In one example approach, a vRouter agent 229 in each host device 210 generates overlay flow data associated with flows generated by and/or received by VMs 228 in the respective host device. In one such example approach, vRouter agent 229 works as a compute node within the respective host device 210. VMs 228 in each host device 210 are launched on the compute node; any overlay traffic generated by a VM 228 hosted on a host device 210 therefore passes through this compute node. vRouter agent 229 therefore has knowledge about this traffic and can identify the virtual network associated with each overlay flow. vRouter agent 229, therefore, sends overlay flow data, containing information identifying the virtual network, to the Flow Collector 124. In some example approaches, such as shown in FIG. 3, the overlay flow data includes information identifying the source virtual network and the destination virtual network for each overlay data flow. In one such example approach, the overlay flow data uses the source VNI and the destination VNI to identify the source virtual network and the destination virtual network, respectively.

The source VN and a destination VN information associated with each underlay data flow may be used to associate a source VN and destination VN with new underlay data flows. In one example, the five overlay tuples (namely, overlay src IP, dest IP, src port, dest Port and protocol) are used as the key, and overlay source VN and destination VN are used as the value. This key-value mapping is stored in a cache, such as a Redis cache. Then, when flow API 256 receives a new underlay data flow, the five overlay tuples in the header may be used to identify source and destination virtual networks. In one such example approach, flow API 256 uses the five overlay tuples as the key to access the cache and obtain the source and destination virtual network identifiers, which are then added to the underlay flow datagram of the new flow. In one example approach, system 240 improves performance by using Redis cache and enriching the underlay flow data in memory before writing the enriched underlay flow data to a database in data store 259, instead of storing the flow data and VN information directly into the database in data store 259, and then reading both from the database in order to enrich flow data in the database.

As noted above, a second approach for identifying the source and destination virtual networks associated with an underlay data flow uses encapsulation attributes to identify the virtual network between the host and the network device. For instance, Ethernet VPNs (EVPN) with Virtual Extensible Local Area Network (VXLAN) encapsulation may be used for layer 2 connectivity between virtual machines and a TOR switch. In one example approach, the virtual network between the host and network device for both the source VN and the destination VN may be identified by querying the appropriate EVPN databases.

As in the first approach, the combination of the underflow flow data and the source and destination overlay network information may then be used to determine a complete path through the underlay network from the source overlay network to the destination overlay network. In one example approach, network analysis system 240 adds the identities of the source and destination virtual networks to each sFlow data sample to form an enriched underlay data flow sample before storing the enriched underlay data flow sample to a database.

Figure 7:
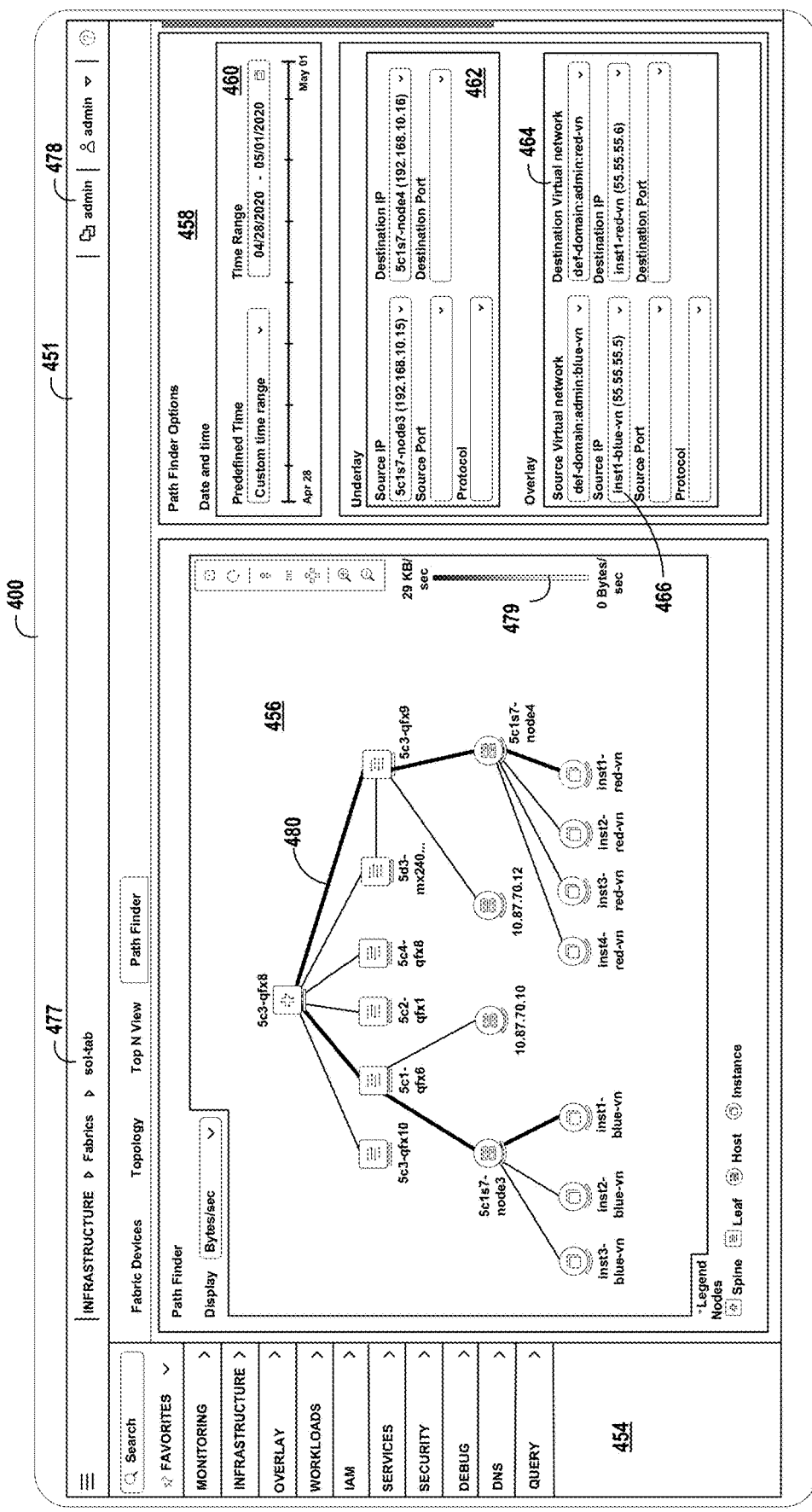
FIG. 7 is a conceptual diagram illustrating another example user interface presented by a user interface device for displaying an underlay data path corresponding to overlay data traffic, in accordance with one or more aspects of the present disclosure.

The enrichment process described herein may be used for queries requesting the "top N" network attributes. The enrichment process may also be used to identify overlay flow paths through the underlay network, as illustrated in FIGS. 4 and 7.

Figure 4:
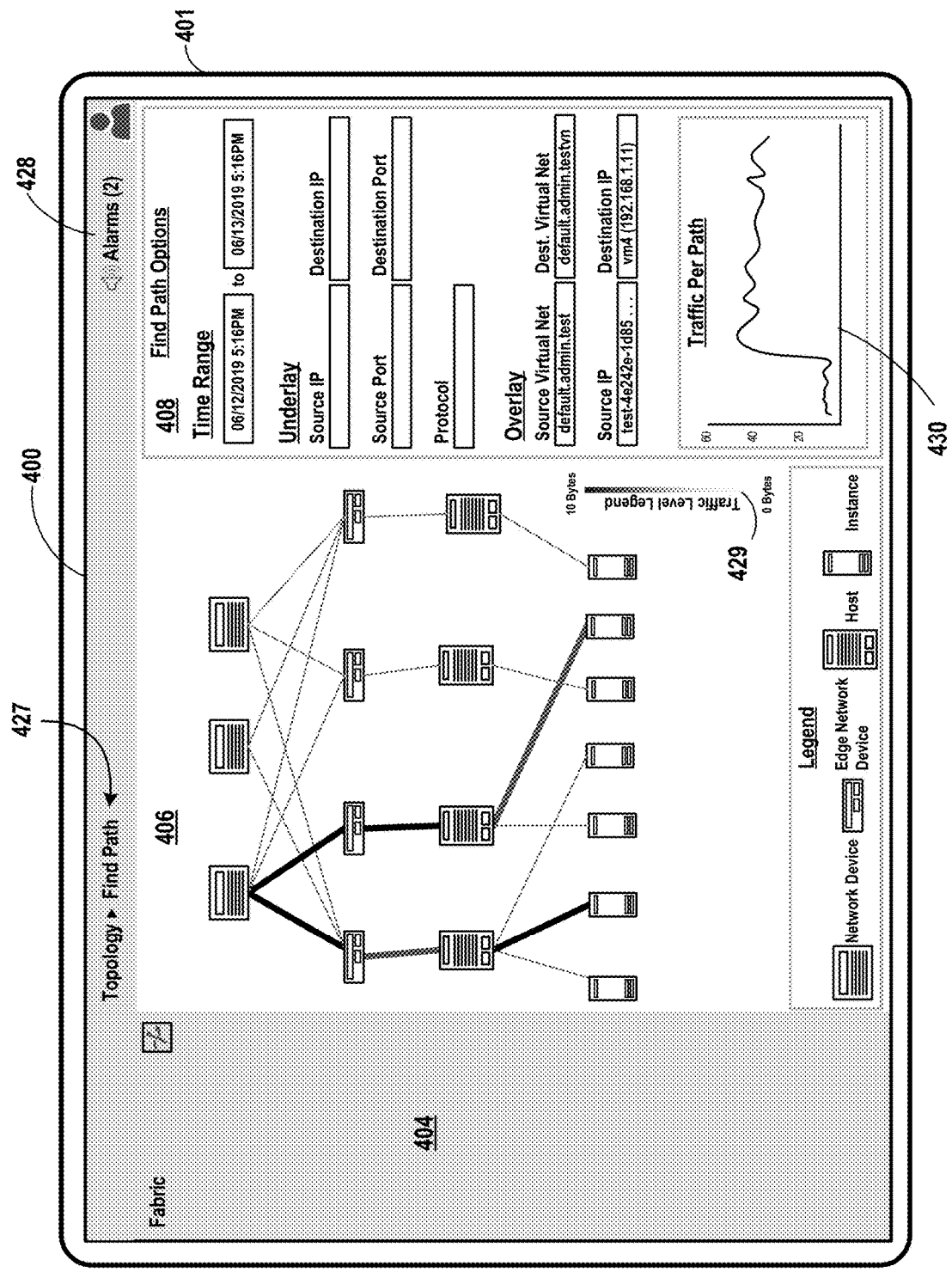
FIG. 4 is a conceptual diagram illustrating an example user interface presented by a user interface device in accordance with one or more aspects of the present disclosure.

FIG. 4 is a conceptual diagram illustrating an example user interface presented by a user interface device in accordance with one or more aspects of the present disclosure. FIG. 4 illustrates an example of a user interface 400. Although user interface 400 is shown as graphical user interface, other types of interfaces may be presented in other examples, including a text-based user interface, a console or command-based user interface, a voice prompt user interface, or any other appropriate user interface. User interface 400 as illustrated in FIG. 4 may correspond to a user interface generated by user interface module 254 of network analysis system 240 and may be presented at user interface device 129 of FIG. 2. One or more aspects relating to the generation and/or presentation of user interface 400 may be described herein within the context of FIG. 2.

In accordance with one or more aspects of the present disclosure, network analysis system 240 may perform a query to identify a path. For instance, in an example that can be described with reference to FIG. 2, user interface device 129 detects input and outputs a signal over network 205. Communication unit 215 of network analysis system 240 detects a signal that flow API 256 determines corresponds to a query for network information. Flow API 256 performs the query (e.g., in the manner described in connection with FIG. 3) and outputs information about the results to user interface module 254. To find the path between two virtual machines, flow API 256 may determine the most likely path (and the traffic that traveled over the determined path). In addition, flow API 256 may perform an additional query to evaluate overlay data flows exclusively, to identify the traffic registered on virtual router modules 224, thereby enabling the identification and display of traffic between the relevant virtual machines and host device. Flow API 256 may use this technique to identify the host-virtual machine path or the virtual machine-host path.

Network analysis system 240 may generate a user interface, such as user interface 400, for presentation at a display device. For instance, still referring to FIG. 2 and FIG. 4, user interface module 254 generates information on an underlying user interface 400 and causes communication unit 215 to output a signal over network 205. User interface device 129 detects a signal and determines that the signal includes information sufficient to present a user interface. User interface device 129 presents user interface 400 at a display device associated with user interface device 129 in the manner illustrated in FIG. 4.

In the example user interface 400 of FIG. 4, user interface 400 is presented within display window 401. User interface 400 includes sidebar region 404, main display region 406, and options region 408. Sidebar region 404 provides an indication of which user interface mode is being presented within user interface 400, which in the example of FIG. 4, corresponds to a "Fabric" mode. Other modes may be available as appropriate for other network analysis scenarios. Over the top of main display region 406 is navigation interface component 427, which may be used to select a type or mode of network analysis to be performed. Status notification display element 428 may provide information about alarms or other status information relating to one or more networks, users, elements, or resources.

Main display region 406 presents a network diagram and may provide a topology of various network devices included within the network being analyzed. In the example shown in FIG. 4, the network is illustrated with network devices, edge network devices, hosts, and instances, as indicated in the "Legend" shown along the bottom of main display region 406. Actual or potential data paths 402 between the network devices and other components are illustrated within main display region 406. Although a limited number of different types of network devices and components are shown in FIG. 4, in other examples, other types of devices or components or elements could be presented and/or specifically illustrated, including core switch devices, spine devices, leaf devices, physical or virtual routers, virtual machines, containers, and/or other devices, components, or elements. Further, some data paths or components of the network (e.g., instances) may be hidden or minimized within user interface 400 to facilitate illustration and/or presentation of components or data paths that are most relevant to a given network analysis.

Options region 408 provides, along the right-hand side of user interface 400, a number of input fields relating to both the underlay network being analyzed (e.g., underlay five-tuple input fields) as well as the overlay network being analyzed (e.g., source and destination virtual network and IP address input fields). User interface 400 accepts input through user interaction with one or more of the displayed input fields, and based on the data entered into the input fields, user interface module 254 presents responsive information about the network being analyzed.

For example, in the example of FIG. 4, user interface 400 accepts input in options region 408 about a specific timeframe (e.g., a time range), a source and destination virtual network, and a source and destination IP address. In the example shown, underlay information has not been specified by user input. Using the input that has been provided in options region 408, network analysis system 240 determines information about one or more possible data paths (e.g., the data path or the most likely data paths) through underlay network devices. Network analysis system 240 determines such possible data paths based on the data collected by network analysis system 240 (e.g., by collector module 252) during the time range specified in options region 408. User interface module 254 of network analysis system 240 generates data enabling the presentation of user interface 400, where one possible data path 402 is highlighted (by drawing each segment of the data path with a wide line) as shown in FIG. 4. In some examples, more than one data path 402 from the source virtual network to the destination virtual network may be highlighted. Further, in some examples, one or more data paths 402 in main display region 406 may be presented using a heat map color scheme, meaning that data paths are illustrated with a color (or shade of gray) that corresponds to the amount of data being communicated over the path, or that corresponds to the extent to which the corresponding path is being utilized. Although FIG. 4 illustrates traffic levels on the highlighted data paths using a gray-scale shading scheme (going from a light shade of gray for low levels of traffic to a dark shade of gray for high traffic as seen in traffic level legend 429), in other examples, a color scheme may be used to demonstrate changes in traffic levels. In other examples, data about the utilization or traffic on data paths or through network devices may be presented in other appropriate ways (e.g., applying color to other elements of main display region 406, presenting pop-up windows, or presenting other user interface elements).

In some examples, options region 408 (or other areas of user interface 400) may include a graph 430 or other indicators providing information about the utilization or traffic on one or more paths. In such examples, the graphs may be pertinent to, or may be generated in response to, user input entered into the input fields within options region 408.

Figure 5A:
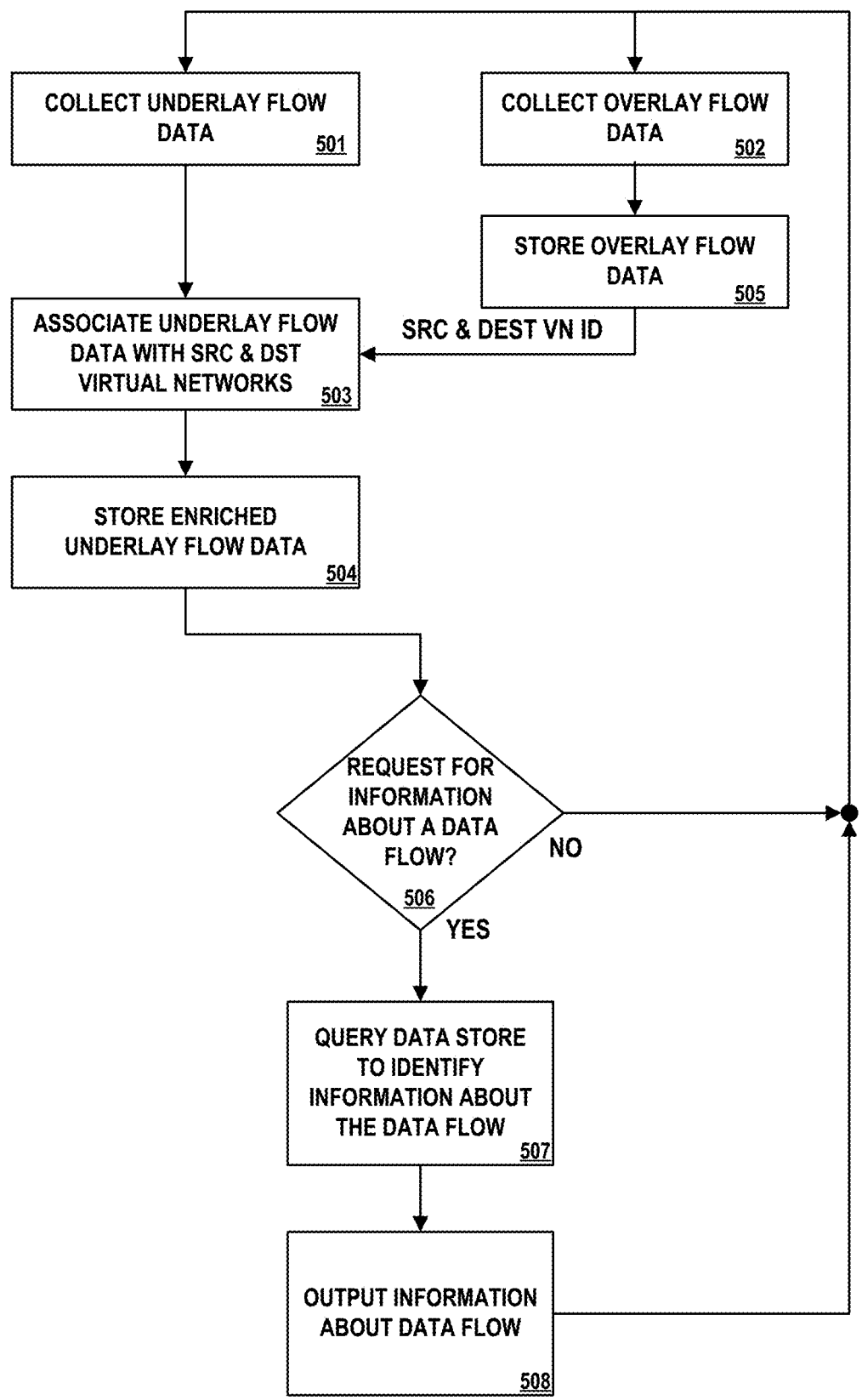
FIGS. 5A and 5B are flow diagrams illustrating operations for enriching underlay data flow in accordance with one or more aspects of the present disclosure.
Figure 5B:
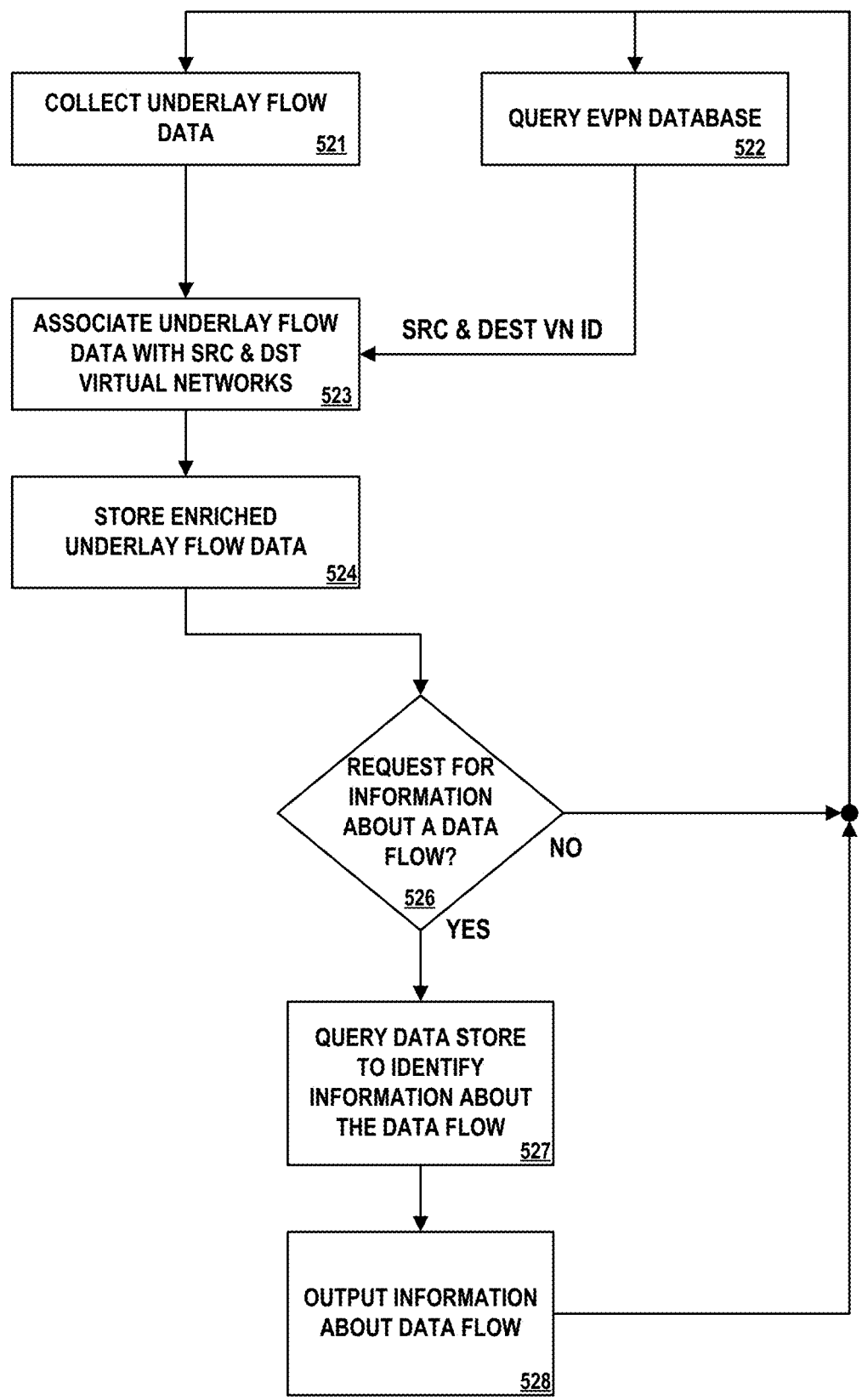

FIGS. 5A and 5B are flow diagrams illustrating operations for enriching underlay flow data in accordance with one or more aspects of the present disclosure. FIGS. 5A and 5B are described herein within the context of network analysis system 240 of FIG. 2. In other examples, operations described in FIGS. 5A and 5B may be performed by one or more other components, modules, systems, or devices. Further, in other examples, operations described in connection with FIGS. 5A and 5B may be merged, performed in a difference sequence, omitted, or may encompass additional operations not specifically illustrated or described.

5A illustrates one approach for using overlay flow data to enrich underlay flow data with source and destination virtual network information. In the example illustrated in FIG. 5A, and in accordance with one or more aspects of the present disclosure, network analysis system 240 may collect underlay flow data (501) and overlay flow data (502). For example, in FIG. 2, each of spine devices 202 and each of leaf devices 203 output respective signals (e.g., sFlow data) over network 205. Communication unit 215 of network analysis system 240 detects signals that collector module 252 determines include underlay flow data 204. Similarly, virtual router modules 224 within each of host devices 210 output a signal over network 205. Communication unit 215 of network analysis system 240 detects additional signals that collector module 252 determines includes overlay flow data 206. In some examples, collector module 252 may load balance the receipt of the signals across multiple collector modules 252 to ensure that a high volume of signals can be processed without delay and/or without loss of data.

In one example approach, network analysis system 240 may store the overlay flow data flow in data store 259 (505). Network analysis system 240 may determine the virtual networks associated with the underlay flow data (503) and store enriched underlay flow data (including virtual network identities extracted from the stored overlay flow data) in data store 259 (504). For example, collector module 252 may output information about the collected flow data (e.g., underlay flow data 204 and overlay flow data 206) to data store 259. Data store 259 stores the flow data in indexed format, and in some examples, in a structure that enables fast aggregations, queries and/or fast random-access data retrieval. In some example approaches, underlay flow data is stored in cache until enriched.

Network analysis system 240 may receive a request for information about a data flow (YES path from 506). For example, user interface device 129 detects input. In one such example, user interface device 129 outputs a signal over network 205. Communication unit 215 of network analysis system 240 detects a signal that flow API 256 determines corresponds to a request for information from a user of user interface device 129. Alternatively, network analysis system 240 may continue to collect and store underlay flow data 204 and overlay flow data 206 until a request for information about a data flow is received (NO path from 506).

Network analysis system 240 may perform a query to identify information about the data flow (507). For example, when network analysis system 240 receives a request for information, flow API 256 parses the request and identifies information that can be used to perform a query. In some cases, the information may include a source and destination virtual network, and/or a relevant timeframe. In other examples, the information may include other information, such as an underlay source or destination IP address or a source or destination port number. Flow API 256 uses the information included within the request to query data store 259 for information about one or more relevant data flows. Data store 259 processes the query, and outputs, to flow API 256, the identity of one or more network devices used by traffic between the source virtual network and the destination virtual network. In some examples, the identity of the network devices may enable flow API 256 to determine one or more likely data paths traversed by traffic between the source and destination virtual networks.

To determine the identity of network devices used by traffic between the source virtual network and the destination virtual network, in one example approach, flow API 256 may query data store 259 for underlay flow data for network devices that have the same five-tuple data (i.e., source and destination address and port number, and protocol) as the virtual networks or virtual IP addresses specified in the query. Network devices identified in underlay flow data that match the five-tuple data are identified as possible network devices used by traffic between the source virtual network and the destination virtual network. Network analysis system 240 may output information about the data flow (508). For example, again referring to FIG. 2, flow API 256 may output to user interface module 254 information about the data paths 402 determined by flow API 256 in response to the query. User interface module 254 generates information sufficient to present a user interface that includes information about the data flow. User interface module 254 causes communication unit 215 to output a signal over network 205 that includes the information sufficient to present a user interface. In some examples, user interface device 129 receives the signal, parses the information, and presents a user interface that illustrates information about the data flow.

In another example approach, to determine the identity of network devices used by traffic between the source virtual network and the destination virtual network, flow API 256 may query data store 259 for underlay flow data for network devices that have the same five-tuple data (i.e., source and destination address and port number, and protocol) and that have information identifying the virtual network as the virtual networks or virtual IP addresses specified in the query. Network devices identified in underlay flow data that match the five-tuple data and virtual network are identified as possible network devices used by traffic between the source virtual network and the destination virtual network. Network analysis system 240 may output information about the data flow (508).

5B illustrates one approach for using one or more EVPN databases to enrich underlay flow data with source and destination virtual network information. In the example illustrated in FIG. 5B, and in accordance with one or more aspects of the present disclosure, network analysis system 240 may collect underlay flow data (521). For example, in FIG. 2, each of spine devices 202 and each of leaf devices 203 output respective signals (e.g., sFlow data) over network 205. Communication unit 215 of network analysis system 240 detects signals that collector module 252 determines include underlay flow data 204. Similarly, virtual router modules 224 within each of host devices 210 output a signal over network 205. Communication unit 215 of network analysis system 240 detects additional signals that collector module 252 determines includes overlay flow data 206. In some examples, collector module 252 may load balance the receipt of the signals across multiple collector modules 252 to ensure that a high volume of signals can be processed without delay and/or without loss of data.

In one example approach, network analysis system 240 may query one or more EVPN databases to obtain the identity of the source and destination virtual networks (522). Network analysis system 240 may receive the identity of the source and destination virtual networks and enrich the underlay flow data with the identities of the virtual networks (523) before storing the enriched underlay flow data in data store 259 (524). In one example approach, data store 259 stores the flow data in indexed format, and in some examples, in a structure that enables fast aggregations, queries and/or fast random-access data retrieval. In some example approaches, underlay flow data is stored in cache until enriched.

Network analysis system 240 may receive a request for information about a data flow (YES path from 526). For example, user interface device 129 detects input. In one such example, user interface device 129 outputs a signal over network 205. Communication unit 215 of network analysis system 240 detects a signal that flow API 256 determines corresponds to a request for information from a user of user interface device 129. Alternatively, network analysis system 240 may continue to collect and store enriched underlay flow data until a request for information about a data flow is received (NO path from 526).

Network analysis system 240 may perform a query to identify information about the data flow (527). For example, when network analysis system 240 receives a request for information, flow API 256 parses the request and identifies information that can be used to perform a query. In some cases, the information may include a source and destination virtual network, and/or a relevant timeframe. In other examples, the information may include other information, such as an underlay source or destination IP address or a source or destination port number. Flow API 256 uses the information included within the request to query data store 259 for information about one or more relevant underlay data flows. Data store 259 processes the query, and outputs, to flow API 256, the identity of one or more network devices used by traffic between the source virtual network and the destination virtual network. In some examples, the identity of the network devices may enable flow API 256 to determine one or more likely data paths traversed by traffic between the source and destination virtual networks.

To determine the identity of network devices used by traffic between the source virtual network and the destination virtual network, in one example approach, flow API 256 may query data store 259 for underlay flow data for network devices that have the same five-tuple data (i.e., source and destination address and port number, and protocol) as the virtual networks or virtual IP addresses specified in the query. Network devices identified in underlay flow data that match the five-tuple data are identified as possible network devices used by traffic between the source virtual network and the destination virtual network. Network analysis system 240 may output information about the data flow (528).

For example, again referring to FIG. 2, flow API 256 may output to user interface module 254 information about the data paths 402 determined by flow API 256 in response to the query. User interface module 254 generates information sufficient to present a user interface that includes information about the data flow. User interface module 254 causes communication unit 215 to output a signal over network 205 that includes the information sufficient to present a user interface. In some examples, user interface device 129 receives the signal, parses the information, and presents a user interface that illustrates information about the data flow.

In another example approach, to determine the identity of network devices used by traffic between the source virtual network and the destination virtual network, flow API 256 may query data store 259 for underlay flow data for network devices that have the same five-tuple data (i.e., source and destination address and port number, and protocol) and that have information identifying the virtual network as the virtual networks or virtual IP addresses specified in the query. Network devices identified in underlay flow data that match the five-tuple data and virtual network are identified as possible network devices used by traffic between the source virtual network and the destination virtual network. Network analysis system 240 may output information about the data flow (528).

Figure 6:
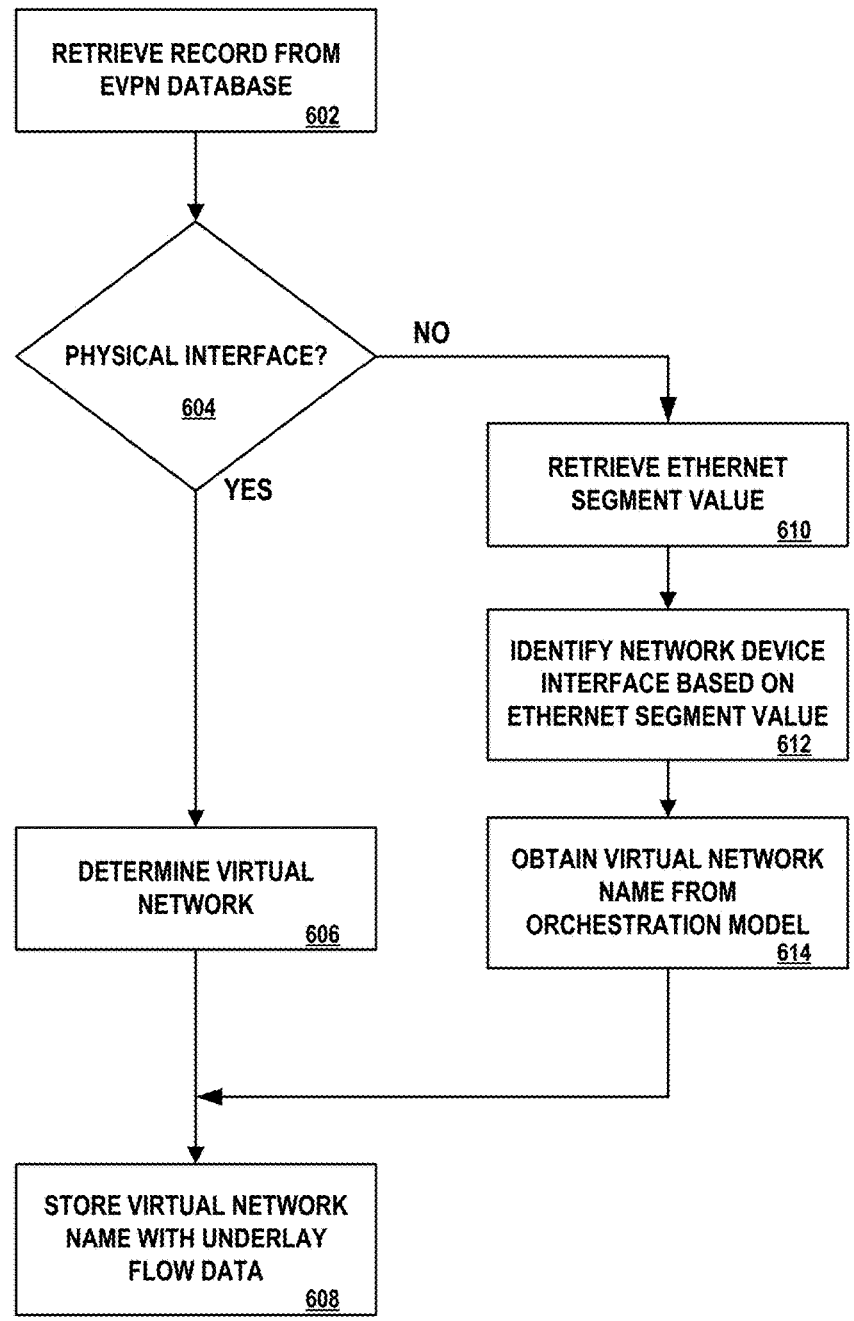
FIG. 6 is a flow diagram illustrating other operations performed by an example network analysis system in accordance with one or more aspects of the present disclosure.

FIG. 6 is a flow diagram illustrating operations performed by an example network analysis system in accordance with one or more aspects of the present disclosure. FIG. 6 is described herein within the context of network analysis system 240 of FIG. 2. In other examples, operations described in FIG. 6 may be performed by one or more other components, modules, systems, or devices. Further, in other examples, operations described in connection with FIG. 6 may be merged, performed in a difference sequence, omitted, or may encompass additional operations not specifically illustrated or described.

In the process illustrated in FIG. 6, network analysis system 240 retrieves a record from an EVPN database. In such one example approach, user interface device 129 includes a command line interface (CLI) used to query an EVPN database via, for instance, a "show evpn database" CLI command (602). The CLI command queries the EVPN database. In one example, the EVPN database returns a physical interface (YES path from 604). For instance, in one example approach, network analysis system 240 transmits the "show evpn database" CLI command and receives back the following information about the physical interface of the network device:

```
{
    "attributes" : {"xmlns" : "http://xml.juniper.net/junos/18.4R2/junos-routing",
            "junos:style" : "normal"
            }
    "vni-id" : [
    {
        "data": "14"
    }
    ],
    "mac-address" : [
    {
        "data" : "02:4d:ad:f1:24:23"
    }
    ],
    "active-source" : [
    {
        "data" : "ge-2/3/0.0"
    }
    ],
    "active-source-timestamp" : [
    {
        "data" : "May 01 16:24:33"
    }
    ],
    "ip-address" : [
    {
        "data" : "55.55.55.5"
    }
    ]
},
```

As noted above, it can be helpful to determine the virtual networks associated with a given underlay data flow. For instance, it is easier to correlate the underlay and overlay data flows when each identifies the same virtual network. In one example approach, therefore, network analysis system 240 uses network information received from other sources to select a path between a network device 110 and a host device 210. In one such approach, a virtual router 229 stores source and destination virtual network identifiers as part of the overlay flow data. In another, in systems 200 that use an Ethernet virtual private network (EVPN) with a Virtual Extensible Local Area Network (VXLAN) for Layer 2 connectivity between virtual machines and a TOR switch, network analysis system 240 retrieves information identifying the path between a host and a leaf network device 203 or TOR switch from an EVPN database. The EVPN database approach will be discussed in greater detail below.

where interface ge-2/3/0.0 is the physical interface on the network device that is connected to a host device 210 whose IP address is 55.55.55.5 and whose VxLAN network identifier (VNI) is 14. The VNI may then be mapped to a specific virtual network (606). Network analysis system 240 then stores the virtual network name with the underlay data flow information as the underlay flow data (608).

When the "show evpn database" CLI command returns information on an interface that is other than a single physical interface (NO path from 604), system 240 may need to derive additional information. For instance, in one example approach, the interface is a Link Aggregation Group (LAG) interface. A LAG interface is a collection of physical ports used as a single interface. A "show evpn database" CLI command for a LAG interface may return the following information:

```
{
    "attributes" : {"xmlns" : "http://xml.juniper.net/junos/18.4R2/junos-routing",
            "junos:style" : "normal"
            }
    "vni-id" : [
    {
        "data": "14"
    }
    ],
    "mac-address" : [
    {
        "data" : "90:e2:ba:50:ab:3d"
    }
    ],
    "active-source" : [
    {
        "data" : "00:92:ce:17:e8:56:c5:3c:f1:00"
    }
    ],
    "active-source-timestamp" : [
    {
        "data" : "May 01 16:44:03"}
    ],
    "ip-address" : [
    {
        "data" : "55.55.55.100"
    }
    ]
},
```

Here, instead of active-source returning the name of a physical interface, active-source instead returns the ethernet segment value of the LAG interface (610). In the example, network analysis system 240 receives the ethernet segment value of 00:92:ce:17:e8:56:c5:3c:f1:00 and determines that the ethernet segment value belongs to interface ae0 (612).

```
Root#5c2-qfx1> show interfaces ae0
Physical interface: ae0, Enabled, Physical Link is Up
Interface index: 154, SNMP ifIndex: 557
Description: Virtual Port Group : 5clsl1-node2-EMS
Link-level type: Ethernet, MTV: 9192, Speed: 10 Gbps, BPDU Error: None, Ethernet-
    Switching Error: None, MAC-REWRITE Error: None, Loopback: Disabled,
    Source filtering: Disabled
Flow control: Disabled, Minimum links needed: 1, Minimum bandwidth needed: 1 bps
Device flags                  : Present Running
Interface flags               : SNMP Traps Internal: 0x4000
Current address               : e4:fc:82:c2:0e:38, Hardware address: e4:fc:82:c2:0e:38
Ethernet segment value: 00:92:ce:17:e8:56:c5:3c:f1:00, Mode: all-active
Last flapped                  : 2020-05-01 16:04:20 UTC (11:14:33 ago)
Input rate                    : 0 bps (0 pps)
Output rate                   : 1008 bps (0 pps)
Logical interface ae0.0 (Index 558) (SNMP ifIndex 558)
    Flags: Up SNMP-Traps 0x24024000 Encapsulation: Ethernet-Bridge
    Statistics         Packets         pps         Bytes         bps
    Bundle:
        Input:         4               0           660           0
        Output:        74380           0           8778306       1016
    Adaptive Statistics:
        Adaptive Adjusts   :           0
        Adaptive Scans     :           0
        Adaptive Adjusts   :           0
    Protocol eth-switch, MTU: 9192
        Flags: Is-Primary, Trunk-Mode
```

Here, the network device is connected on LAG interface ae0 and the IP address 55.55.55.100 is on VNI 14. Network analysis system 240 may then query an orchestration model (such as the Contrail Config Object) to obtain the corresponding virtual network name (614). In one example approach, such a query returns the following information:

```
- {
    virtual-network: - {
        virtual_network_properties : - {
            vxlan_network_identifier: 14
        },
        virtual_network_network_id: 10,
        parent_uuid : "4bd90b1d-8237-43b3-b102-806624dc4f78" ,
        address_allocation_mode: "user-defined-subnet-preferred" ,
        parent_href: "http://10.84.30.201:8082/project/4bd90bld-8237-43b3-b102-
            806624dc4f78",
        parent_type: "project",
        href: "http://10.84.30.201:8082/virtual-network/1f0004a5-87b4-4ebc-aa36-
            e79b743f64c",
        id_perms: + { },
        fq_name: + [ ],
        routing_instances: + [ ],
        name: "blue-vn",
        virtual_network_category: " infra",
        display_name: "blue-vn",
        uuid: " 1f0004a5-87b4-4ebc-aa36-e79b743f64c",
        perms2: + { }
    }
}
```

In this example, a VNI of 14 maps to virtual network having the name "blue-vn," showing how one may map from information retrieved from the EVPN database to a virtual network name, even when the interface is not a single physical interface. Network analysis system 240 then stores the virtual network name with the underlay data flow information as the underlay flow data (608).

FIG. 7 is a conceptual diagram illustrating an example user interface presented by a user interface device for displaying an underlay data path corresponding to overlay data traffic, in accordance with one or more aspects of the present disclosure. In the example shown in FIG. 7, user interface 400 demonstrates the EVPN database example above. In FIG. 7, user interface 400 is presented within display window 451. User interface 400 includes sidebar region 454, main display region 456, and options region 458. Sidebar region 454 provides an indication of which user interface mode is being presented within user interface 400, which in the example of FIG. 7, corresponds to a "Fabrics" mode. Other modes are shown in FIG. 7 and others may be available as appropriate for other network analysis scenarios. Over the top of main display region 456 is navigation interface component 477, which may be used to select a type or mode of network analysis to be performed. Status notification display element 478 may provide information about the user or may provide other status information relating to one or more networks, users, elements, or resources.

Main display region 456 presents a network diagram and may provide a topology of various network devices included within the network being analyzed. In the example shown in FIG. 7, the network is illustrated with network devices, edge network devices, hosts, and instances, as indicated in the "Legend" shown along the bottom of main display region 456. In the example shown in FIG. 7, the network devices, edge network devices, hosts and instances shown in main display region 456 correspond to the spine devices 202, leaf devices 203, host devices 210 and virtual machines 228, respectively, of system 200 in FIG. 2.

Actual or potential data paths 480 between the network devices and other components are illustrated within main display region 456. Although a limited number of different types of network devices and components are shown in FIG. 7, in other examples, other types of devices or components or elements could be presented and/or specifically illustrated, including core switch devices, spine devices, leaf devices, physical or virtual routers, virtual machines, containers, and/or other devices, components, or elements. Further, some data paths or components of the network (e.g., instances) may be hidden or minimized within user interface 400 to facilitate illustration and/or presentation of components or data paths that are most relevant to a given network analysis.

In the example shown in FIG. 7, options region 458 provides, along the right-hand side of user interface 400, a number of input fields relating to both the underlay network being analyzed (e.g., underlay five-tuple input fields) as well as the overlay network being analyzed (e.g., source and destination virtual network fields, source and destination IP address fields, source and destination port fields and a protocol field). User interface 400 accepts input through user interaction with one or more of the displayed fields, and based on the data entered into the input fields, user interface module 254 presents responsive information about the network being analyzed.

For instance, in the example of FIG. 7, user interface 400 accepts input parameters in options region 458. In the example shown in FIG. 7, the input parameters include information about a specific timeframe (e.g., a time range, entered in time range input 460), a source and destination underlay IP address 462, a source and destination virtual network in overlay virtual network inputs 464, and an overlay source and destination IP address 466. In the example shown in FIG. 7, underlay information has not been specified by user input. Instead, overlay information in the form of source and destination virtual network fields and source and destination IP address fields are provided to steer the search for the data path. Network analysis system 240 uses the provided input to determine information about one or more possible data paths 480 (e.g., the data path or the most likely data path or paths) through underlay network devices. In the example shown, network analysis system 240 determines such possible data paths based on the data collected by network analysis system 240 (e.g., by collector module 252) during the time range 460 specified in options region 458. User interface module 254 of network analysis system 240 generates data enabling the presentation of user interface 400, where one possible data path is highlighted (by drawing each segment of the data path with a wide line) as shown in FIG. 7. In some examples, more than one data path 480 from the source virtual network to the destination virtual network may be highlighted.

In some examples, one or more data paths 480 in main display region 456 may be presented using a heat map color scheme, meaning that data paths are illustrated with a color (or shade of gray) that corresponds to the amount of data being communicated over the path, or that corresponds to the extent to which the corresponding path is being utilized. As noted above, although FIG. 7 illustrates traffic levels on the highlighted data paths 480 using a gray-scale shading scheme (going from a light shade of gray for low levels of traffic to a dark shade of gray for high traffic as seen in traffic level legend 479), in other examples, a color scheme may be used to demonstrate changes in traffic levels. In other examples, data about the utilization or traffic on data paths or through network devices may be presented in other appropriate ways (e.g., applying color to other elements of main display region 456, presenting pop-up windows, or presenting other user interface elements).

In one example approach, network analysis system 240 may be used to select other parameters, such as timeframe, or underlay or overlay parameters and the path between the two nodes is plotted on the topology based on the selected parameters. For instance, historical paths may be visualized by selecting a time range via date and time input boxes in time range input 460.

In some examples, options region 458 (or other areas of user interface 400) may include a graph (not shown) or other indicators providing information about the utilization or traffic on one or more paths. In such examples, the graphs may be pertinent to, or may be generated in response to, user input entered into the input fields within options region 458.

As noted above, the path a packet takes in a network can be visualized using sFlow and topology data. Once, the nodes and edges have been obtained, the topology may be plotted, and the path may be visualized on the topology graph. Different approaches to displaying network flow information will be discussed next.

Figure 8:
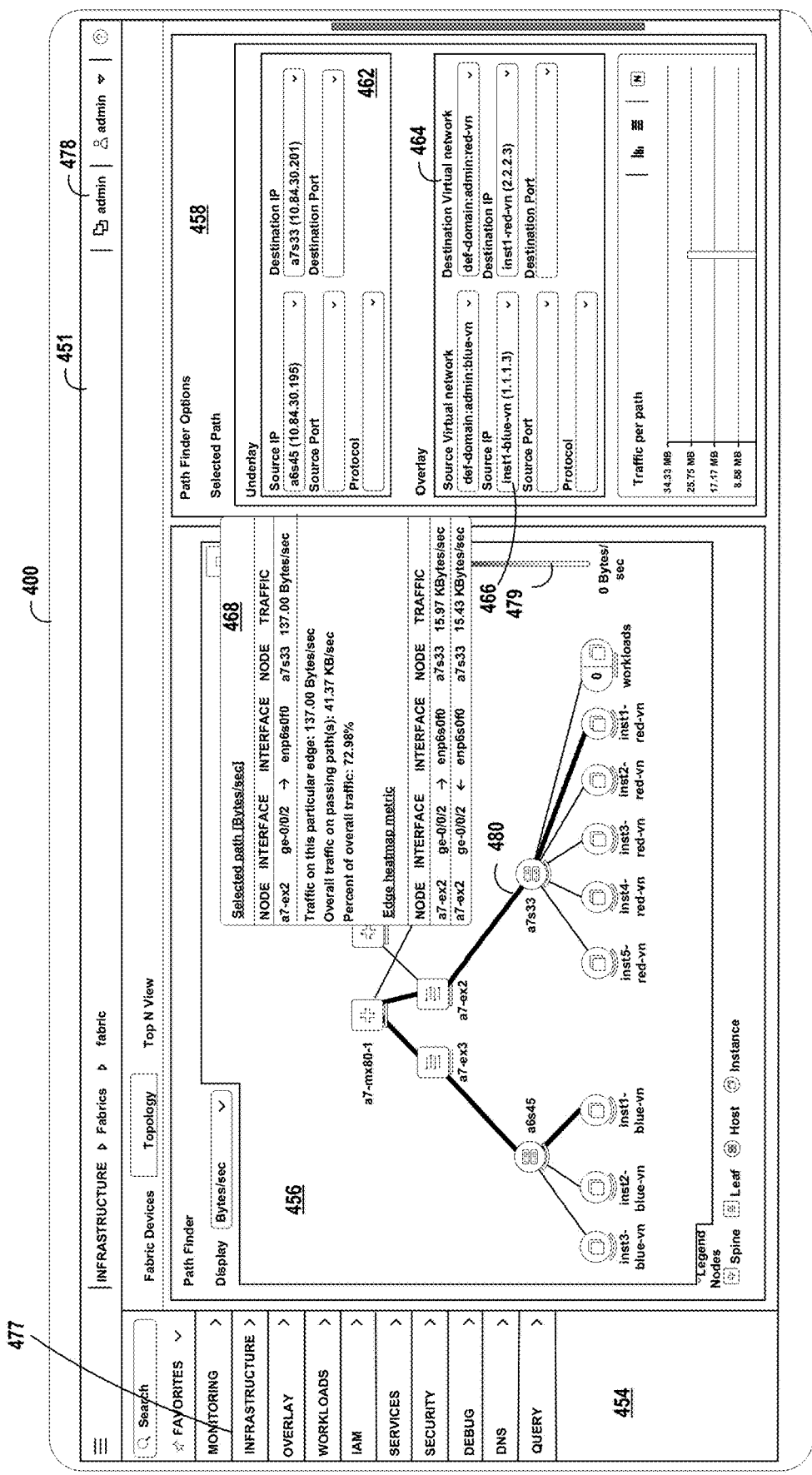
FIG. 8 is a conceptual diagram illustrating a user interface used to display path parameters in an overlay data path such as is shown in FIG. 7, in accordance with one or more aspects of the present disclosure.

FIG. 8 is a conceptual diagram illustrating a user interface used to display path parameters in an underlay data path such as is shown in FIG. 7, in accordance with one or more aspects of the present disclosure. In the example shown in FIG. 8, user interface 400 once again demonstrates data path visualization. In FIG. 8, user interface 400 is presented within display window 451. User interface 400 includes sidebar region 454, main display region 456, and options region 458. Sidebar region 454 provides an indication of which user interface mode is being presented within user interface 400 which, in the example of FIG. 8, corresponds to a "Fabrics" mode. Other modes are shown in FIG. 8 and others may be available as appropriate for other network analysis scenarios. Over the top of main display region 456 is navigation interface component 477, which may be used to select a type or mode of network analysis to be performed. Status notification display element 478 may provide information about the user or may provide other status information relating to one or more networks, users, elements, or resources.

Main display region 456 presents a network diagram. In the example shown, a network topology is displayed of various network devices included within the network being analyzed. In the example shown in FIG. 8, the network is illustrated with network devices, edge network devices, hosts, and instances, as indicated in the "Legend" shown along the bottom of main display region 456. In the example shown in FIG. 8, the network devices, edge network devices, hosts and instances shown in main display region 456 correspond to the spine devices 202, leaf devices 203, host devices 210 and virtual machines 228, respectively, of system 200 in FIG. 2.

Actual or potential data paths 480 between the network devices and other components are illustrated within main display region 456. Although a limited number of different types of network devices and components are shown in FIG. 8, in other examples, other types of devices or components or elements could be presented and/or specifically illustrated, including core switch devices, spine devices, leaf devices, physical or virtual routers, virtual machines, containers, and/or other devices, components, or elements. Further, some data paths or components of the network (e.g., instances) may be hidden or minimized within user interface 400 to facilitate illustration and/or presentation of components or data paths that are most relevant to a given network analysis.

As in the example shown in FIG. 7, in FIG. 8, options region 458 provides, along the right-hand side of user interface 400, a number of input fields relating to both the underlay network being analyzed (e.g., underlay five-tuple input fields) as well as the overlay network being analyzed (e.g., source and destination virtual network fields, source and destination IP address fields, source and destination port fields and a protocol field). User interface 400 accepts input through user interaction with one or more of the displayed fields and, based on the data entered into the input fields, user interface module 254 presents responsive information about the network being analyzed.

For instance, in the example of FIG. 8, user interface 400 accepts input parameters in options region 458. In the example shown in FIG. 8, the input parameters include information about a specific timeframe (e.g., a time range, entered in time range input 460), a source and destination underlay IP address 462, a source and destination virtual network in overlay virtual network inputs 464, and a source and destination overlay IP address 466.

In the example shown in FIG. 8, underlay information has been specified by user input. In addition, overlay information in the form of source and destination virtual network fields and source and destination IP address fields are provided to steer the search for the underlay data path 480. Network analysis system 240 uses the provided input to determine information about one or more possible data paths (e.g., the data path or the most likely data paths) through underlay network devices, such as spine devices 202 and leaf devices 203 of FIG. 2. In the example shown, network analysis system 240 determines such possible data paths based on the data collected by network analysis system 240 (e.g., by collector module 252) during the time range specified in options region 458. User interface module 254 of network analysis system 240 generates data enabling the presentation of user interface 400, where one possible data path 480 is highlighted (e.g., by drawing each segment of the data path with a wide line) as shown in FIG. 8. In some examples, more than one data path from the source virtual network to the destination virtual network may be highlighted. In some example approaches, other data paths may be dimmed to enhance the contrast with the highlighted data path or paths.

As in the example shown in FIG. 7 above, in some examples, one or more data paths 480 in main display region 456 may be presented using a heat map color scheme, meaning that data paths are illustrated with a color (or shade of gray) that corresponds to the amount of data being communicated over the path, or that corresponds to the extent to which the corresponding path is being utilized. As noted above, although FIG. 7 illustrates traffic levels on the highlighted data paths using a gray-scale shading scheme (going from a light shade of gray for low levels of traffic to a dark shade of gray for high traffic as seen in traffic level legend 479), in other examples, a color scheme may be used to demonstrate changes in traffic levels. In other examples, data about the utilization or traffic on data paths or through network devices may be presented in other appropriate ways (e.g., applying color to other elements of main display region 456, presenting pop-up windows, or presenting other user interface elements).

Furthermore, as shown in FIG. 8, in some examples, tooltips over the edges of a highlighted path show the traffic details between the two nodes. For instance, in one example approach, placing the cursor on one of the highlighted data paths causes a metric display window 468 to appear. In the example shown in FIG. 8, metric display window 468 displays the traffic volume between two virtual machines 228, the overall traffic on the path and the percent of overall traffic taken by the data path. In one such example approach, the traffic displayed reflects the traffic measured on the segment of the data path touched by the cursor. In one example approach, the data shown via a tool touch is a selectable parameter.

In some examples, options region 458 (or some other area of user interface 400) also includes a graph 430, as shown in FIG. 8, or other indicators providing information about the utilization or traffic on one or more paths 480. In such examples, the graphs may be pertinent to, or may be generated in response to, user input entered into input fields 460, 462, 464 and 466 within options region 458.

Figure 9:
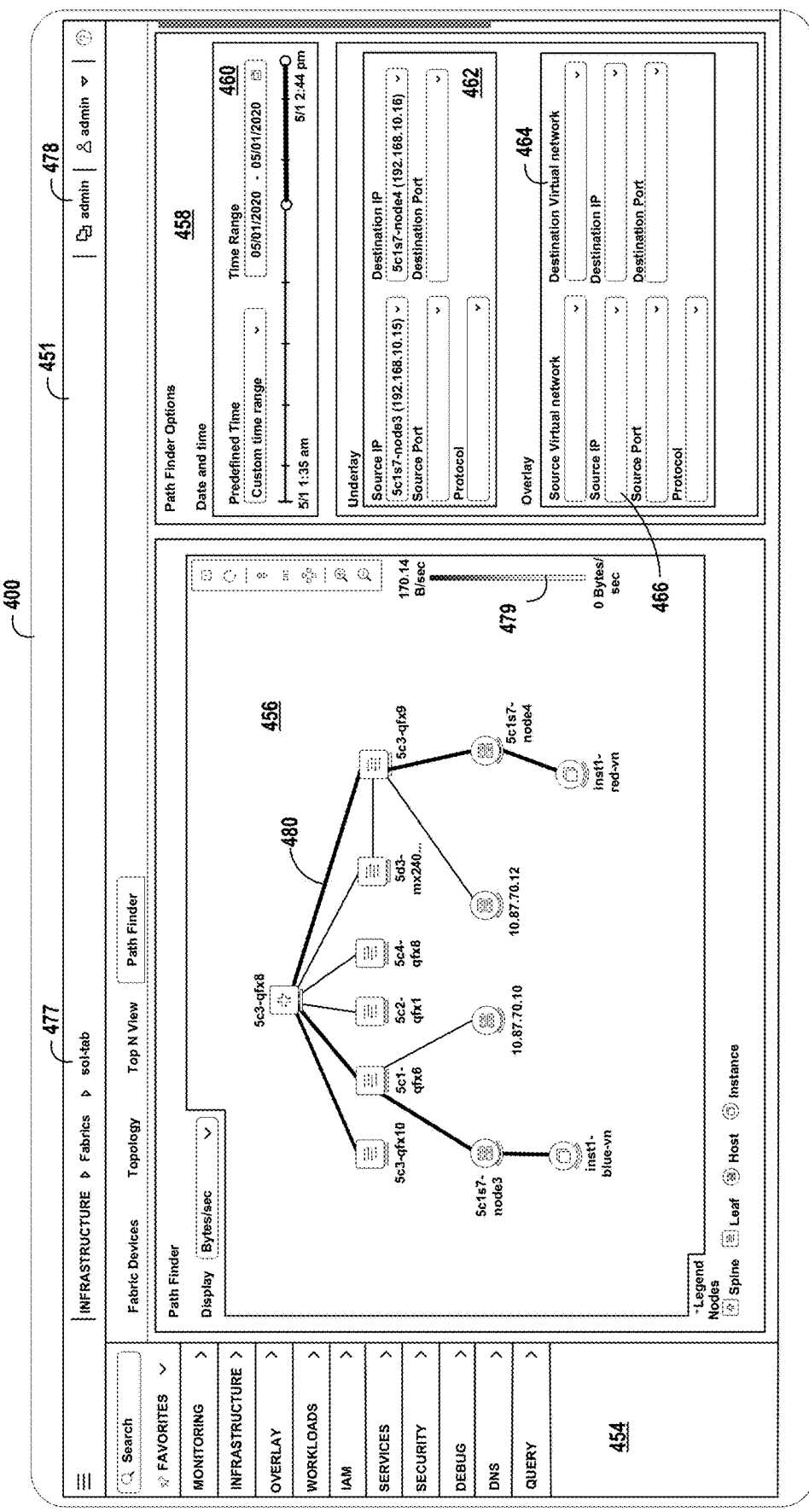
FIG. 9 is a conceptual diagram illustrating an example data flow between two nodes of an underlay network, in accordance with one or more aspects of the present disclosure.

FIG. 9 is a conceptual diagram illustrating an example data flow between two nodes of an underlay network, in accordance with one or more aspects of the present disclosure. In the example shown in FIG. 9, the user selects two distinct underlay network nodes via source and destination underlay IP addresses 462. Network analysis system 240 then determines data paths between the two underlay network nodes and highlights the data paths 480 as shown in FIG. 9. In some example approaches, data paths 480 are highlighted while the other topology links are faded. There may be multiple paths 480, and all may be highlighted as shown in FIG. 9.

In one example approach, network analysis system 240 may be used to select other parameters, such as timeframe, or underlay or overlay parameters and the path between the two nodes is plotted on the topology based on the selected parameters. In the example shown in FIG. 9, the input parameters include information about a specific timeframe (e.g., a time range, entered in time range input 460), a source and destination underlay IP address 462, a source and destination virtual network in overlay virtual network inputs 464, and a source and destination overlay IP address 466. For instance, historical paths may be visualized by selecting a time range via date and time input boxes in time range input 460. Only traffic matching the corresponding parameters are displayed in FIG. 9.

Figure 10:
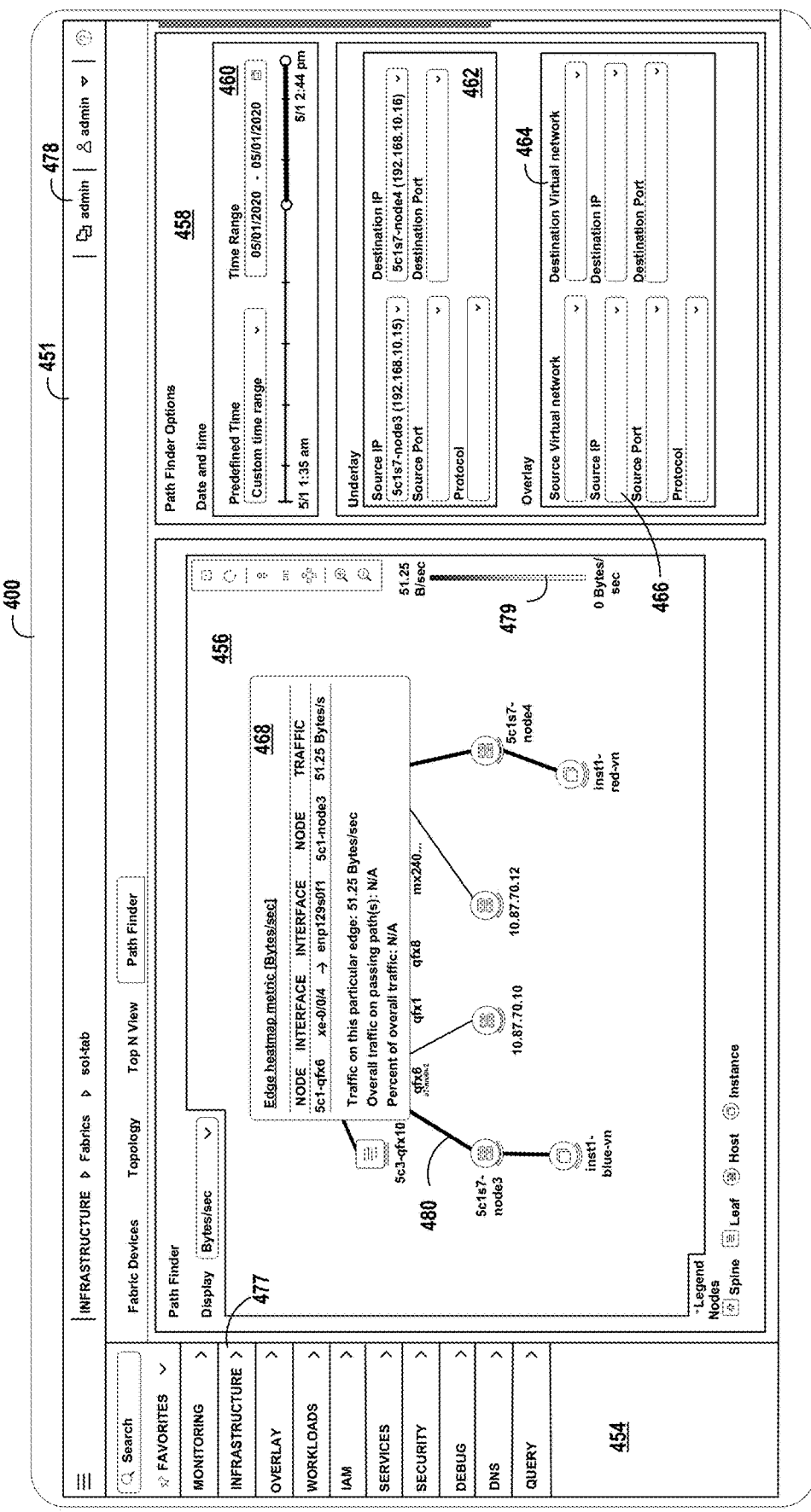
FIG. 10 is a conceptual diagram illustrating a user interface used to display path parameters in an overlay data path such as is shown in FIG. 9, in accordance with one or more aspects of the present disclosure.

FIG. 10 is a conceptual diagram illustrating a user interface used to display path parameters in an underlay data path such as is shown in FIG. 9, in accordance with one or more aspects of the present disclosure. As shown in FIG. 10, in some examples, tooltips over the edges of a highlighted path show the traffic details between the two nodes. For instance, in one example approach, placing the cursor on one of the highlighted data paths causes a metric display window 468 to appear. In the example shown in FIG. 10, metric display window 468 displays the traffic volume between two virtual machines 228, the overall traffic on the path and the percent of overall traffic taken by the data path. In one such example approach, the traffic displayed reflects the traffic measured on the segment of the data path touched by the cursor. In one example approach, the data shown via a tool touch is a selectable parameter.

In some examples, options region 458 (or some other area of user interface 400) may include a graph such as graph 430 of FIG. 4, or other indicators providing information about the utilization or traffic on one or more paths 480. In such examples, the graphs may be pertinent to, or may be generated in response to, user input entered into input fields 460, 462, 464 and 466 within options region 458.

Figure 11:
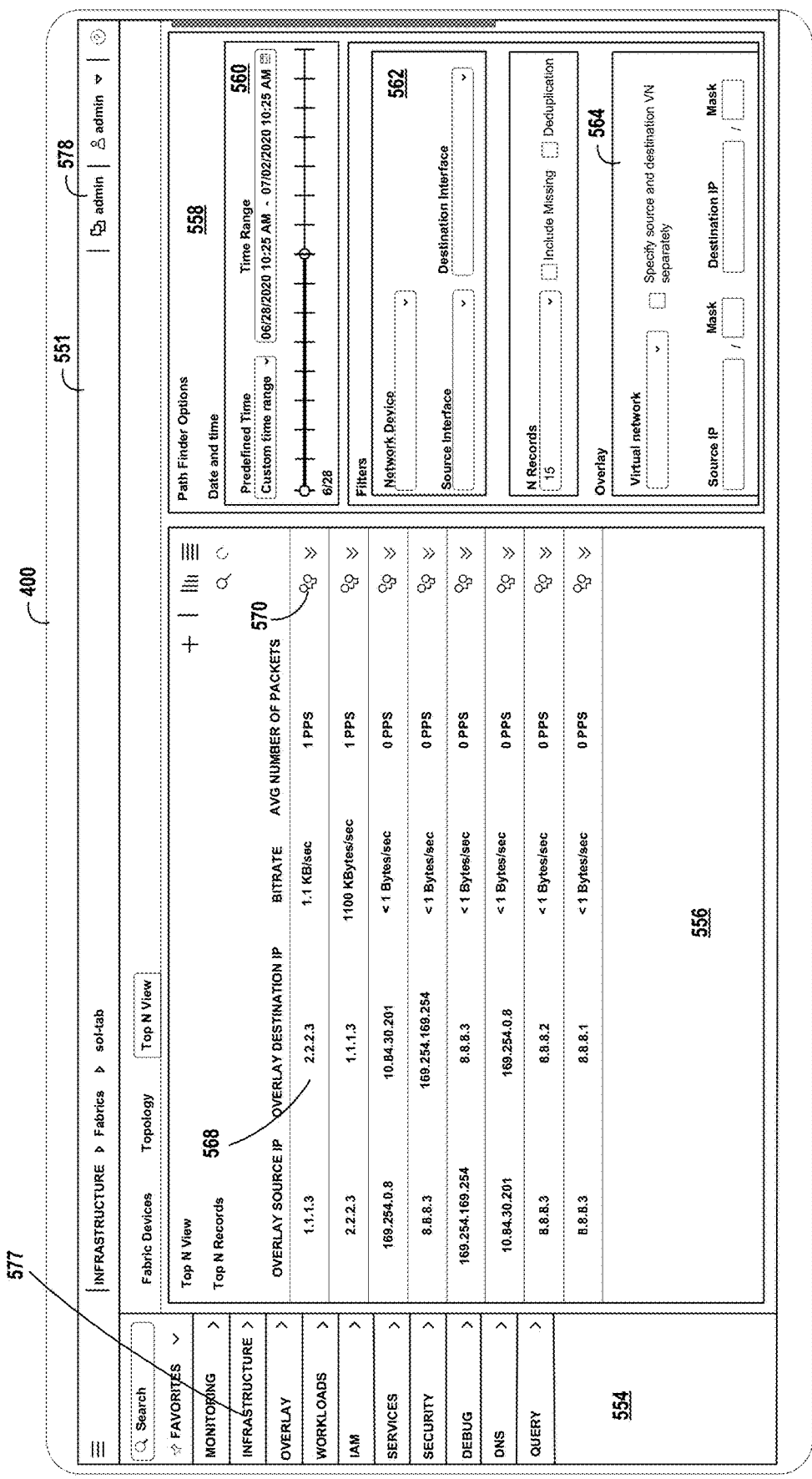
FIG. 11 is a conceptual diagram illustrating an example user interface used to select between overlay data paths when determining corresponding underlay data paths, in accordance with one or more aspects of the present disclosure.

FIG. 11 is a conceptual diagram illustrating an example user interface used to select between overlay data paths when determining corresponding underlay data paths, in accordance with one or more aspects of the present disclosure. In the example shown in FIG. 11, user interface 400 lists the top N records matching the parameters shown in options region 558.

In FIG. 11, user interface 400 is presented within display window 551. User interface 400 in FIG. 11 includes sidebar region 554, main display region 556, and options region 558. Sidebar region 554 provides an indication of which user interface mode is being presented within user interface 400, which in the example of FIG. 11, corresponds to a "Fabrics" mode. Other modes are shown in FIG. 11 and others may be available as appropriate for other network analysis scenarios. Over the top of main display region 556 is navigation interface component 577, which may be used to select a type or mode of network analysis to be performed. Status notification display element 578 may provide information about the user or may provide other status information relating to one or more networks, users, elements, or resources.

Main display region 556 presents a listing of the top N overlay data flows 568 detected within the network being analyzed. In the example approach shown in FIG. 11, a find path selector 570 may be used to select the overlay data flow for which an underlay data path 480 is to be visualized.

In the example shown in FIG. 11, options region 558 provides, along the right-hand side of user interface 400, a number of input fields relating to the analysis of overlay data flows. In the example approach of FIG. 11, the overlay data flows may be analyzed during time frames via time range input 560. The overlay data flows may also be filtered by parameters such as network device, source interface or destination interface in underlay parameters 562, or by source virtual network, destination virtual network, source IP or destination IP in overlay parameters 564. The resulting overlay data flows are displayed as a list of flow records 568. In some example approaches, the number of records to be displayed is selectable as shown in options region 558.

In the example shown in FIG. 11, a "Find Path" link 570 is provided to an application for finding and displaying an underlay data path or data paths associated with a given overlay record 568. In some examples, the techniques described above are used to find and display data path(s) 480 associated with a given record 568.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., user interface devices 129, spine devices 202, leaf devices 203, host devices 210, network analysis system 240, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   receiving an underlay flow record from a network having an underlay network and one or more overlay networks, the underlay network including a plurality of network devices, the underlay flow record including information identifying an underlay network source device of the plurality of network devices, an underlay network destination device of the plurality of network devices, an overlay network source device, and an overlay network destination device for a first underlay packet flow of a plurality of underlay packet flows;
   storing, in a data store, an enriched underlay flow record for the underlay flow record, the enriched underlay flow record identifying an overlay network of the one or more overlay networks, the underlay network source device, the underlay network destination device, the overlay network source device, and the overlay network destination device for the first underlay packet flow;
   displaying, within a display, a topological map of at least a portion of the underlay network;
   receiving, via a graphical user interface, a first indication specifying a time frame, the overlay network source device, and the overlay network destination device;
   determining, based on the enriched underlay flow record identifying the overlay network source device and the overlay network destination device specified by the first indication, an underlay data path over which the overlay network source device and the overlay network destination device exchange data traffic during the time frame, the underlay data path extending through the underlay network from the underlay network source device to the underlay network destination device;
   highlighting the determined underlay data path on the displayed topological map;
   receiving a request for metrics associated with the highlighted underlay data path, wherein receiving the request includes receiving, via the graphical user interface, a second indication selecting at least a portion of the highlighted underlay data path; and
   displaying, proximate to the highlighted underlay data path, metrics associated with the data traffic exchanged by the overlay network source device and the overlay network destination device through the selected at least a portion of the highlighted underlay data path and during the time frame.

2. The method of claim 1,
   wherein the method further comprises receiving an address of the underlay network source device and an address of the underlay network destination device, and
   wherein determining, based on the enriched underlay flow record identifying the overlay network source device and the overlay network destination device specified by the first indication, the underlay data path comprises determining the underlay data path from the address of the underlay network source device to the address of the underlay network destination device based on the enriched underlay flow record identifying the overlay network source device and the overlay network destination device specified by the first indication, the underlay data path, the address of the underlay network source device, and the address of the underlay network destination device.

3. The method of claim 1, wherein receiving the first indication comprises receiving a first indication specifying a first overlay packet flow of a plurality of overlay packet flows, the first overlay packet flow selected from a list of a plurality of overlay flow records corresponding to the plurality of overlay packet flows.

4. The method of claim 1,
   wherein receiving the first indication comprises:
      displaying a list of overlay flow records corresponding to a plurality of overlay packet flows;
      displaying, next to each overlay flow record, a link to an underlay data path-finding application;
      receiving an indication that a link to the underlay data path-finding application associated with a first overlay flow record of the overlay flow records was selected;
      determining the first overlay flow record associated with the selected link; and
      determining the overlay network source device and the overlay network destination device of a first overlay packet flow corresponding to the first overlay flow record.

5. The method of claim 4, wherein the list of overlay flow records comprises a list of overlay flow records occurring during the time frame.

6. The method of claim 1, wherein displaying the metrics includes:
   generating visual information indicating a traffic level associated with the data traffic exchanged by the overlay network source device and the overlay network destination device through the selected at least a portion of the highlighted underlay data path and during the time frame; and
   displaying the visual information indicating the traffic level on the display.

7. The method of claim 6, wherein generating the visual information includes generating a heat map illustrating the traffic level associated with the data traffic exchanged by the overlay network source device and the overlay network destination device through the selected at least a portion of the highlighted underlay data path.

8. The method of claim 7, wherein the heat map illustrating the traffic level associated with the data traffic exchanged by the overlay network source device and the overlay network destination device through the selected at least a portion of the highlighted underlay data path is in color.

9. The method of claim 7, wherein the heat map illustrating the traffic level associated with the data traffic exchanged by the overlay network source device and the overlay network destination device through the selected at least a portion of the highlighted underlay data path is in gray scale.

10. The method of claim 1, wherein highlighting the determined underlay data path includes identifying the underlay network source device, the underlay network destination device, and one or more network devices of the plurality of network devices that processed at least one packet of the data traffic exchanged between the overlay network source device and the overlay network destination device during the time frame.

11. The method of claim 1, wherein displaying the metrics includes:
generating visual information indicating a traffic level associated with the data traffic exchanged by the overlay network source device and the overlay network destination device through the selected at least a portion of the highlighted underlay data path and during the time frame; and
displaying the visual information indicating the traffic level on the display in a metric display window.

12. The method of claim 1, wherein displaying the metrics includes:
generating visual information indicating a traffic level associated with the data traffic exchanged by the overlay network source device and the overlay network destination device through the selected at least a portion of the highlighted underlay data path and during the time frame; and
displaying the visual information indicating the traffic level on the display in a metric display window placed proximate to the selected at least a portion of the highlighted underlay data path.

13. A system, comprising:
a network, the network having a plurality of network devices configured in an underlay network and one or more overlay networks executing on the plurality of network devices; and
processing circuitry connected to the network, the processing circuitry configured to perform operations comprising:
receiving an underlay flow record from the network, the underlay flow record including information identifying an underlay network source device of the plurality of network devices, an underlay network destination device of the plurality of network devices, an overlay network source device, and an overlay network destination device for a first underlay packet flow of a plurality of underlay packet flows;
storing, in a data store, an enriched underlay flow record for the underlay flow record, the enriched underlay flow record identifying an overlay network of the one or more overlay networks, the underlay network source device, the underlay network destination device, the overlay network source device, and the overlay network destination device for the first underlay packet flow;
displaying, within a display, a topological map of at least a portion of the underlay network;
receiving, via a graphical user interface, a first indication specifying a time frame, the overlay network source device, and the overlay network destination device;
determining, based on the enriched underlay flow record identifying the overlay network source device and the overlay network destination device specified by the first indication, an underlay data path over which the overlay network source device and the overlay network destination device exchange data traffic during the time frame, the underlay data path extending through the underlay network from the underlay network source device to the underlay network destination device;
highlighting the determined underlay data path on the displayed topological map;
receiving a request for metrics associated with the highlighted underlay data path, wherein receiving the request includes receiving, via the graphical user interface, a second indication information selecting at least a portion of the highlighted underlay data path; and
displaying, proximate to the highlighted underlay data path, metrics associated with the data traffic exchanged by the overlay network source device and the overlay network destination device through the selected at least a portion of the highlighted underlay data path and during the time frame.

14. The system of claim 13,
wherein the operations further comprise receiving an address of the underlay network source device and an address of the underlay network destination device, and
wherein determining, based on the enriched underlay flow record identifying the overlay network source device and the overlay network destination device specified by the first indication, the underlay data path comprises determining the underlay data path from the address of the underlay network source device to the address of the underlay network destination device based on the enriched underlay flow record identifying the overlay network source device and the overlay network destination device specified by the first indication, the underlay data path, the address of the underlay network source device, and the address of the underlay network destination device.

15. The system of claim 13, wherein receiving the first indication comprises:
displaying a list of overlay flow records corresponding to a plurality of overlay packet flows;
displaying, next to each overlay flow record, a link to an underlay data path-finding application;
receiving an indication that a link to the underlay data path-finding application associated with a first overlay flow record of the overlay flow records was selected;
determining the first overlay flow record associated with the selected link; and
determining the overlay network source device and the overlay network destination device of a first overlay packet flow corresponding to the first overlay flow record.

16. The system of claim 13, wherein displaying the metrics include:
generating visual information indicating a traffic level associated with the data traffic exchanged by the overlay network source device and the overlay network destination device through the selected at least a portion of the highlighted underlay data path and during the time frame; and
displaying the visual information indicating the traffic level on the display in a metric display window.

17. A non-transitory computer-readable storage medium comprising instructions that, when executed, configure processing circuitry of a computing system to perform operations comprising:

receiving an underlay flow record from a network having an underlay network and one or more overlay networks, the underlay network including a plurality of network devices, the underlay flow record including information identifying an underlay network source device of the plurality of network devices, an underlay network destination device of the plurality of network devices, an overlay network source device and an overlay network destination device for a first underlay packet flow of a plurality of underlay packet flows;

storing, in a data store, an enriched underlay flow record for the underlay flow record, the enriched underlay flow record identifying an overlay network of the one or more overlay networks, the underlay network source device, the underlay network destination device, the overlay network source device, and the overlay network destination device for the first underlay packet flow;

displaying, within a display, a topological map of at least a portion of the underlay network;

receiving, via a graphical user interface, a first indication specifying a time frame, the overlay network source device, and the overlay network destination device;

determining, based on the enriched underlay flow record identifying the overlay network source device and the overlay network destination device specified by the first indication, an underlay data path over which the overlay network source device and the overlay network destination device exchange data traffic during the time frame, the underlay data path extending through the underlay network from the underlay network source device to the underlay network destination device;

highlighting the determined underlay data path on the displayed topological map;

receiving a request for metrics associated with the highlighted underlay data path, wherein receiving the request includes receiving, via the graphical user interface, a second indication selecting at least a portion of the highlighted underlay data path; and displaying, proximate to the highlighted underlay data path, metrics associated with the data traffic exchanged by the overlay network source device and the overlay network destination device through the selected at least a portion of the highlighted underlay data path and during the time frame.

* * * * *